(12) United States Patent
Park et al.

(10) Patent No.: US 10,506,297 B2
(45) Date of Patent: *Dec. 10, 2019

(54) BROADCAST SIGNAL FRAME GENERATION DEVICE AND BROADCAST SIGNAL FRAME GENERATION METHOD USING BOOTSTRAP INCLUDING SYMBOL FOR SIGNALING BICM MODE OF PREAMBLE AND OFDM PARAMETER TOGETHER

(71) Applicant: Electronics and Telecommunications Research Institute, Daejeon (KR)

(72) Inventors: Sung-Ik Park, Daejeon (KR); Jae-Young Lee, Daejeon (KR); Sun-Hyoung Kwon, Daejeon (KR); Heung-Mook Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/185,457

(22) Filed: Nov. 9, 2018

(65) Prior Publication Data

US 2019/0082228 A1    Mar. 14, 2019

Related U.S. Application Data

(63) Continuation of application No. 15/556,973, filed as application No. PCT/KR2016/002528 on Mar. 14, 2016, now Pat. No. 10,187,701.

(30) Foreign Application Priority Data

Mar. 16, 2015 (KR) .................. 10-2015-0036152
Mar. 27, 2015 (KR) .................. 10-2015-0043570

(Continued)

(51) Int. Cl.
*H04N 21/61* (2011.01)
*H04L 1/00* (2006.01)
(Continued)

(52) U.S. Cl.
CPC ....... *H04N 21/6112* (2013.01); *H04H 20/426* (2013.01); *H04L 5/0048* (2013.01);
(Continued)

(58) Field of Classification Search
CPC ............ H04N 21/6112; H04N 21/2383; H04L 5/0048; H04L 27/363; H04L 27/3854; H04L 27/18
(Continued)

(56) References Cited

U.S. PATENT DOCUMENTS 9,094,278 B2    7/2015  Kim et al.
9,729,904 B2    8/2017  Hong et al.
(Continued)

FOREIGN PATENT DOCUMENTS

KR    10-2012-071214 A    7/2012
WO    WO 2012/036429 A2   3/2012
WO    WO 2015/005656 A1   1/2015

OTHER PUBLICATIONS

International Search Report issued in counterpart International Application No. PCT/KR2016/002528 dated Jul. 22, 2016 (2 pages in English; 2 pages in Korean).

*Primary Examiner* — Kevin Kim
(74) *Attorney, Agent, or Firm* — NSIP Law

(57) ABSTRACT

An apparatus and method for broadcast signal frame using a bootstrap including a symbol for signaling a BICM mode and OFDM parameters of a preamble, together are disclosed. An apparatus for generating broadcast signal frame according to an embodiment of the present invention includes a time interleaver configured to generate a time- (Continued)

interleaved signal by performing interleaving on a BICM output signal; and a frame builder configured to generate a broadcast signal frame including a bootstrap and a preamble using the time-interleaved signal. In this case, the bootstrap includes a symbol for signaling a BICM mode and OFDM parameters of L1-Basic of the preamble, together.

10 Claims, 17 Drawing Sheets

(30) Foreign Application Priority Data

Apr. 24, 2015 (KR) .......................... 10-2015-0057756
Mar. 11, 2016 (KR) .......................... 10-2016-0029468

(51) Int. Cl.
| | | |
|---|---|---|
| *H04H 20/42* | (2008.01) | |
| *H04L 5/00* | (2006.01) | |
| *H04L 27/36* | (2006.01) | |
| *H04N 21/2383* | (2011.01) | |
| *H04L 27/38* | (2006.01) | |
| *H04W 28/06* | (2009.01) | |
| *H04L 27/18* | (2006.01) | |

(52) U.S. Cl.
CPC ....... *H04L 27/362* (2013.01); *H04N 21/2383* (2013.01); *H04L 1/007* (2013.01); *H04L 1/0058* (2013.01); *H04L 1/0068* (2013.01); *H04L 27/18* (2013.01); *H04L 27/3854* (2013.01); *H04L 2001/0093* (2013.01); *H04W 28/06* (2013.01)

(58) Field of Classification Search
USPC ......................................... 375/295, 365, 366
See application file for complete search history.

(56) References Cited

U.S. PATENT DOCUMENTS

| | | |
|---|---|---|
| 2013/0219431 A1 | 8/2013 | Hong et al. |
| 2015/0055727 A1 | 2/2015 | Kim et al. |
| 2015/0071373 A1 | 3/2015 | Oh et al. |
| 2018/0131457 A1* | 5/2018 | Michael ................ H04H 60/40 |

* cited by examiner

BROADCAST SIGNAL FRAME GENERATION DEVICE AND BROADCAST SIGNAL FRAME GENERATION METHOD USING BOOTSTRAP INCLUDING SYMBOL FOR SIGNALING BICM MODE OF PREAMBLE AND OFDM PARAMETER TOGETHER

CROSS-REFERENCE TO RELATED APPLICATIONS

This application is a Continuation of U.S. application Ser. No. 15/556,973, filed on Sep. 8, 2017, which claims the benefit under 35 USC 119(a) of PCT Application No. PCT/KR2016/002528, filed on Mar. 14, 2016, which claims the benefit of Korean Patent Application No. 10-2015-0036152 filed Mar. 16, 2015, Korean Patent Application No. 10-2015-0043570 filed on Mar. 27, 2015, Korean Patent Application No. 10-2015-0057756 filed on Apr. 24, 2015, and Korean Patent Application No. 10-2016-0029468 filed on Mar. 11, 2016, the entire disclosures of which are incorporated herein by reference for all purposes.

TECHNICAL FIELD

The present invention relates to broadcast signal transmission/reception technology that is used in a broadcasting system and, more particularly, to a broadcast signal transmission/reception system that transmits/receives the broadcast signal using a frame including signaling fields such as a bootstrap or a preamble.

BACKGROUND ART

Bit-Interleaved Coded Modulation (BICM) is bandwidth-efficient transmission technology, and is implemented in such a manner that an error-correction coder, a bit-by-bit interleaver and a high-order modulator are combined with one another.

BICM can provide excellent performance using a simple structure because it uses a low-density parity check (LDPC) coder or a Turbo coder as the error-correction coder. Furthermore, BICM can provide high-level flexibility because it can select modulation order and the length and code rate of an error correction code in various forms. Due to these advantages, BICM has been used in broadcasting standards, such as DVB-T2 and DVB-NGH, and has a strong possibility of being used in other next-generation broadcasting systems.

Such BICM may be used not only for the transmission of data but also for the transmission of signaling information. In particular, channel encoding and modulation techniques for the transmission of signaling information need to be more robust than channel encoding and modulation techniques for the transmission of data.

Moreover, it is very important to effectively signal a structure of the preamble or an OFDM parameter for transmitting signaling information in the broadcasting telecommunication system and may determine the whole efficiency of the broadcasting telecommunication system.

DISCLOSURE

Technical Problem

An object of the present invention is to provide a new broadcast signal frame structure capable of efficiently signaling a BICM mode or an OFDM parameter of the signaling field used for transmitting signaling information in broadcast system channel.

Furthermore, an object of the present invention is to enable each service to use a proper BICM mode efficiently using signaling BICM modes which provide various SNRs.

Furthermore, an object of the present invention is to efficiently signaling a BICM mode such as constellation or a code rate, and an OFDM parameter such as a FFT size, guard interval or a pilot pattern, simultaneously.

Technical Solution

In order to accomplish the above objects, the present invention provides an apparatus for generating broadcast signal frame, including: a time interleaver configured to generate a time-interleaved signal by performing interleaving on a BICM output signal; and a frame builder configured to generate a broadcast signal frame including a bootstrap and a preamble using the time-interleaved signal. In this case, the bootstrap may include a symbol for signaling a BICM mode and OFDM parameters of L1-Basic of the preamble, together.

In this case, the symbol may correspond to a fixed-length bit string signaling the BICM mode of the L1-Basic along with the OFDM parameters of the L1-Basic.

In this case, the fixed-length bit string may be a bit string capable of identifying 256 combinations.

In this case, the OFDM parameters may correspond to a combination of a FFT size, a guard interval length and a pilot pattern.

In this case, the BICM mode may include a first mode, a second mode and a third mode for identifying QPSK and a code rate of 3/15, a fourth mode for identifying 16-NUC (Non Uniform Constellation) and a code rate of 3/15, and a fifth mode for identifying 64-NUC (Non Uniform Constellation) and a code rate of 3/15.

In this case, the OFDM parameters may support all combinations of FFT sizes and guard interval lengths corresponding to data symbols for each of the first mode, the second mode, the third mode, the fourth mode and the fifth mode, and may correspond to 32 selected pilot patterns which are generated by selecting one or two among pilot patterns corresponding to each of the all combinations.

In this case, the first mode may correspond to a mode in which the parity repetition is performed, and the second and third modes may correspond to a mode in which the parity repetition is not performed.

In this case, the parity puncturing size of the second mode may be larger than the parity puncturing size of the first mode and be smaller than the parity puncturing size of the third mode.

In this case, the symbol may correspond to a lookup table in which a preamble structure corresponding to a second guard interval length is allocated prior to a preamble structure corresponding to a first guard interval length, the second guard interval length being shorter than the first guard interval length when the FFT sizes corresponding to the OFDM parameters are the same.

In this case, the symbol may correspond to a lookup table in which the first mode, the second mode, the third mode, the fourth mode and the fifth mode are allocated in an order of robustness for the same combination of a FFT size, a guard interval length and a pilot pattern.

Furthermore, an embodiment of the present invention provides a method of generating broadcast signal frame, including: generating a time-interleaved signal by performing interleaving on a BICM output signal; and generating a broadcast signal frame including a bootstrap and a preamble using the time-interleaved signal. In this case, the bootstrap may include a symbol for signaling a BICM mode and OFDM parameters of L1-Basic of the preamble, together.

In this case, the symbol may correspond to a fixed-length bit string signaling the BICM mode of the L1-Basic along with the OFDM parameters of the L1-Basic.

In this case, the fixed-length bit string may be a bit string capable of identifying 256 combinations.

In this case, the OFDM parameters may correspond to a combination of a FFT size, a guard interval length and a pilot pattern.

In this case, the BICM mode may include a first mode, a second mode and a third mode for identifying QPSK and a code rate of 3/15, a fourth mode for identifying 16-NUC (Non Uniform Constellation) and a code rate of 3/15, and a fifth mode for identifying 64-NUC (Non Uniform Constellation) and a code rate of 3/15.

In this case, the OFDM parameters may support all combinations of FFT sizes and guard interval lengths corresponding to data symbols for each of the first mode, the second mode, the third mode, the fourth mode and the fifth mode, and may correspond to 32 selected pilot patterns which are generated by selecting one or two among pilot patterns corresponding to each of the all combinations.

In this case, the first mode may correspond to a mode in which the parity repetition is performed, and the second and third modes may correspond to a mode in which the parity repetition is not performed.

In this case, the parity puncturing size of the second mode may be larger than the parity puncturing size of the first mode and be smaller than the parity puncturing size of the third mode.

In this case, the symbol may correspond to a lookup table in which a preamble structure corresponding to a second guard interval length is allocated prior to a preamble structure corresponding to a first guard interval length, the second guard interval length being shorter than the first guard interval length when the FFT sizes corresponding to the OFDM parameters are the same.

In this case, the symbol may correspond to a lookup table in which the first mode, the second mode, the third mode, the fourth mode and the fifth mode are allocated in an order of robustness for the same combination of a FFT size, a guard interval length and a pilot pattern.

Advantageous Effects

According to the present invention, a new broadcast signal frame structure capable of efficiently signaling a BICM mode or an OFDM parameter of the signaling field used for transmitting signaling information in broadcast system channel is provided.

Furthermore, according to the present invention, each service can use a proper BICM mode efficiently using signaling BICM modes which provide various SNRs.

Furthermore, according to the present invention, a BICM mode such as constellation or a code rate, and an OFDM parameter such as a FFT size, guard interval or a pilot pattern, can efficiently be signaled simultaneously.

MODE FOR INVENTION

Figure 1:
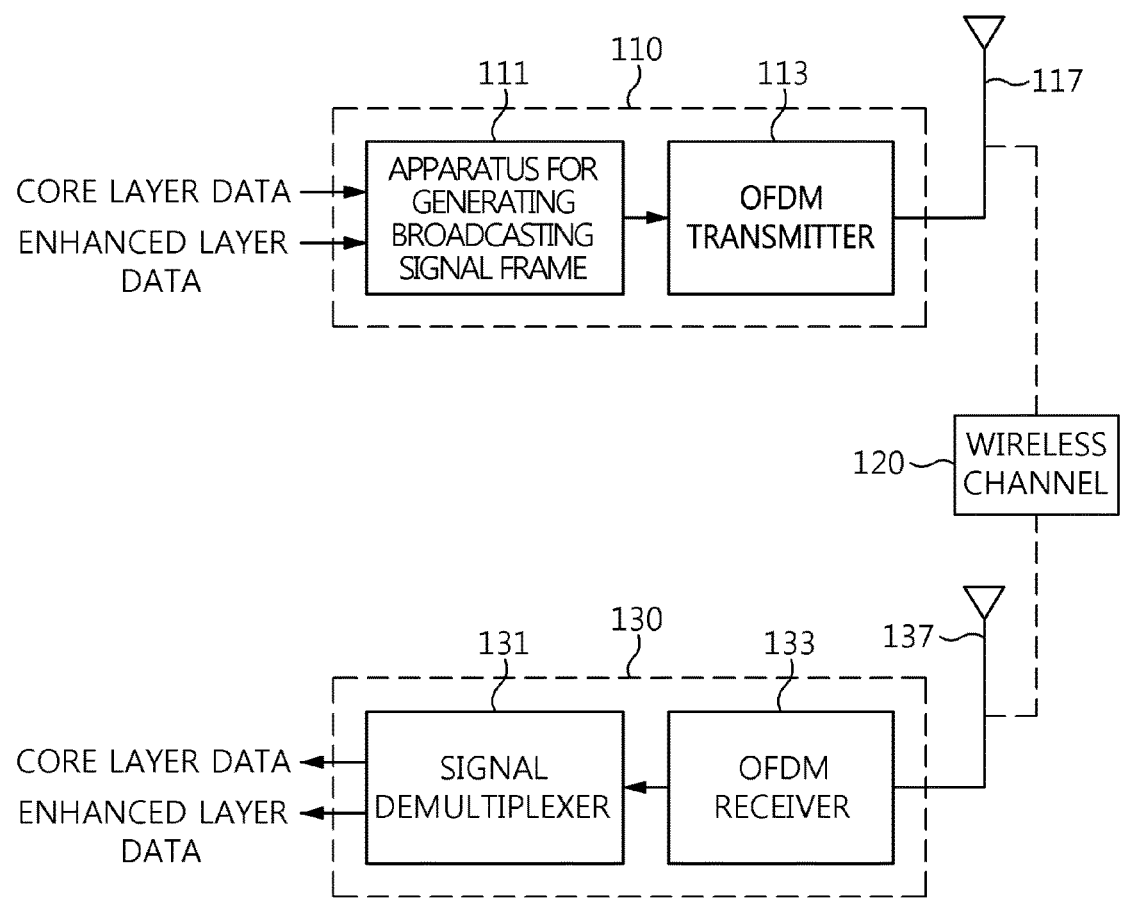
FIG. 1 is a block diagram showing a broadcast signal transmission/reception system according to an embodiment of the present invention.

The present invention will be described in detail below with reference to the accompanying drawings. In the description, redundant descriptions and descriptions of well-known functions and configurations that have been deemed to make the gist of the present invention unnecessarily obscure will be omitted below. The embodiments of the present invention are provided to fully describe the present invention to persons having ordinary knowledge in the art to which the present invention pertains. Accordingly, the shapes, sizes, etc. of components in the drawings may be exaggerated to make the description obvious.

Preferred embodiments of the present invention are described in detail below with reference to the accompanying drawings.

FIG. 1 is a block diagram showing a broadcast signal transmission/reception system according to an embodiment of the present invention.

Referring to FIG. 1, a broadcast signal transmission/reception system according to the embodiment of the present invention includes a broadcast signal transmission apparatus 110, a wireless channel 120, and a broadcast signal reception apparatus 130.

The broadcast signal transmission apparatus 110 includes an apparatus for generating broadcast signal frame 111 which generate the broadcast signal frame by multiplexing core layer data and enhanced layer data, and an OFDM transmitter 113.

The apparatus 111 combines a core layer signal corresponding to core layer data and an enhanced layer signal corresponding to enhanced layer data at different power levels, and generates a multiplexed signal by performing interleaving that is applied to both the core layer signal and the enhanced layer signal. In this case, the apparatus 111 may generate a broadcast signal frame including a bootstrap and a preamble using a time-interleaved signal. In this case, the broadcast signal frame may be an ATSC 3.0 frame.

According to an embodiment, the apparatus 111 may interleave one layer signal and generate the broadcast signal frame without combining two layer signals.

The OFDM transmitter 113 transmits the generated broadcast signal frame using an OFDM communication method via an antenna 117, thereby allowing the transmitted OFDM signal to be received via the antenna 137 of the broadcast signal reception apparatus 130 over the wireless channel 120.

The broadcast signal reception apparatus 130 includes an OFDM receiver 133 and a signal demultiplexer 131. When the signal transmitted over the wireless channel 120 is received via the antenna 137, the OFDM receiver 133 receives an OFDM signal via synchronization, channel estimation and equalization.

In this case, the OFDM receiver 133 may detect and demodulate the bootstrap from the OFDM signal, demodulate the preamble using information included in the bootstrap, and demodulate the data payload using information included in the preamble. In this case, the data payload may be a super-imposed payload which corresponds to a combination of two or more data layers.

The signal demultiplexer 131 restores the core layer data from the signal (super-imposed payload) received via the OFDM receiver 133 first, and then restores the enhanced layer data via cancellation corresponding to the restored core layer data. In this case, the signal demultiplexer 131 may generate a broadcast signal frame first, may restore the bootstrap, may restore the preamble using the information included in the bootstrap, and may use the signaling information included in the preamble for the restoration of a data signal. In this case, the signaling information may be L1 signaling information and may include injection level information, normalizing factor information, etc.

As will be described in detail later, the apparatus 111 shown in FIG. 1 may include a combiner configured to generate a multiplexed signal by combining a core layer signal and an enhanced layer signal at different power levels; a power normalizer configured to reduce the power of the multiplexed signal to a power level corresponding to the core layer signal; a time interleaver configured to generate a time-interleaved signal by performing interleaving that is applied to both the core layer signal and the enhanced layer signal; and a frame builder configured to generate a broadcast signal frame including a bootstrap and a preamble using the time-interleaved signal. In this case, the broadcast signal transmission apparatus 110 shown in FIG. 1 may be viewed as including: a combiner configured to generate a multiplexed signal by combining a core layer signal and an enhanced layer signal at different power levels; a power normalizer configured to reduce the power of the multiplexed signal to a power level corresponding to the core layer signal; a time interleaver configured to generate a time-interleaved signal by performing interleaving that is applied to both the core layer signal and the enhanced layer signal; a frame builder configured to generate a broadcast signal frame including a bootstrap and a preamble using the time-interleaved signal; and an OFDM transmitter configured to transmit the broadcast signal frame using OFDM communication scheme through an antenna.

According to an embodiment, the apparatus 111 shown in FIG. 1 may include a time interleaver configured to generate a time-interleaved signal by performing interleaving on a BICM output signal; and a frame builder configured to generate a broadcast signal frame including a bootstrap and a preamble using the time-interleaved signal, in case of a single layer. In this case, the bootstrap may include a symbol for signaling a BICM mode and OFDM parameters of L1-Basic of the preamble, together. In this case, the BICM output signal may be an output signal of a BICM apparatus which will be described later. In this case, the broadcast signal transmission apparatus 110 shown in FIG. 1 may be viewed as including: a time interleaver configured to generate a time-interleaved signal by performing interleaving on a BICM output signal; a frame builder configured to generate a broadcast signal frame including a bootstrap and a preamble using the time-interleaved signal; and an OFDM transmitter configured to transmit the broadcast signal frame using OFDM communication scheme through an antenna. In this case, the bootstrap may include a symbol for signaling a BICM mode and OFDM parameters of L1-Basic of the preamble, together.

As will be described in detail later, the signal demultiplexer shown in FIG. 1 may include a time deinterleaver configured to generate a time-deinterleaved signal by applying time deinterleaving to a received signal corresponding to a broadcast signal frame; a de-normalizer configured to increase the power of the received signal or the time-deinterleaved signal by a level corresponding to a reduction in power by the power normalizer of the transmitter; a core layer BICM decoder configured to restore core layer data from the signal power-adjusted by the de-normalizer; an enhanced layer symbol extractor configured to extract an enhanced layer signal by performing cancellation corresponding to the core layer data on the signal power-adjusted by the de-normalizer using the output signal of the core layer FEC decoder of the core layer BICM decoder; a de-injection level controller configured to increase the power of the enhanced layer signal by a level corresponding to a reduction in power by the injection level controller of the transmitter; and an enhanced layer BICM decoder configured to restore enhanced layer data using the output signal of the de-injection level controller. In this case, the broadcast signal reception apparatus 130 shown in FIG. 1 may be viewed as including: an OFDM receiver configured to generate a received signal by performing any one or more of synchronization, channel estimation and equalization on a transmitted signal corresponding to a broadcast signal frame; a time deinterleaver configured to generate a time-deinterleaved signal by applying time deinterleaving to the received signal; a de-normalizer configured to increase the power of the received signal or the time-deinterleaved signal by a level corresponding to a reduction in power by the power normalizer of the transmitter; a core layer BICM decoder configured to restore core layer data from the signal power-adjusted by the de-normalizer; an enhanced layer symbol extractor configured to extract an enhanced layer signal by performing cancellation corresponding to the core layer data on the signal power-adjusted by the de-normalizer using the output signal of the core layer FEC decoder of the core layer BICM decoder; a de-injection level controller configured to increase the power of the enhanced layer signal by a level corresponding to a reduction in power by the injection level controller of the transmitter; and an enhanced layer BICM decoder configured to restore enhanced layer data using the output signal of the de-injection level controller.

Although not explicitly shown in FIG. 1, a broadcast signal transmission/reception system according to an embodiment of the present invention may multiplex/demultiplex one or more pieces of extension layer data in addition to the core layer data and the enhanced layer data. In this case, the extension layer data may be multiplexed at a power level lower than that of the core layer data and the enhanced layer data. Furthermore, when two or more extension layers are included, the injection power level of a second extension layer may be lower than the injection power level of a first extension layer, and the injection power level of a third extension layer may be lower than the injection power level of the second extension layer.

Figure 2:
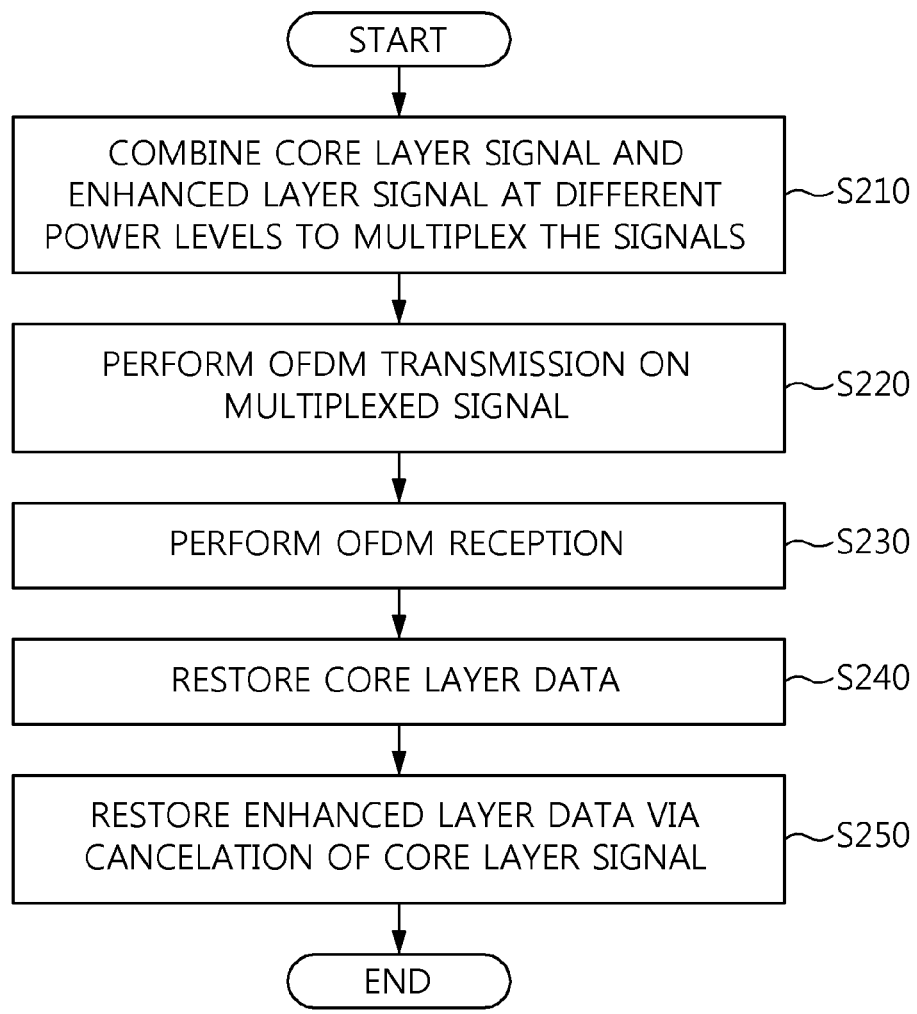
FIG. 2 is an operation flowchart showing a broadcast signal transmission/reception method according to an embodiment of the present invention.

FIG. 2 is an operation flowchart showing a broadcast signal transmission/reception method according to an embodiment of the present invention.

Referring to FIG. 2, in the broadcast signal transmission/reception method according to the embodiment of the present invention, a core layer signal and an enhanced layer signal are combined at different power levels and then multiplexed to generate a broadcast signal frame including a bootstrap and a preamble at step S210.

In this case, the broadcast signal frame generated at step S210 may include the bootstrap, the preamble and a data payload. In this case, the data payload may be a superimposed payload. In this case, at least of the bootstrap and the preamble may include L1 signaling information. In this case, the L1 signaling information may include injection level information and normalizing factor information.

According to an embodiment, the broadcast signal frame which includes a bootstrap and a preamble may be generated by interleaving the BICM output signal at step S210.

In this case, the bootstrap may include a symbol for signaling a BICM mode and OFDM parameters of L1-Basic of the preamble, together.

Furthermore, in the broadcast signal transmission/reception method according to the embodiment of the present invention, the broadcast signal frame is OFDM transmitted at step S220.

Furthermore, in the broadcast signal transmission/reception method according to the embodiment of the present invention, the transmitted signal is OFDM received at step S230.

In this case, at step S230, synchronization, channel estimation and equalization may be performed.

In this case, the bootstrap may be restored, the preamble may be restored using a signal included in the restored bootstrap, and the data signal may be restored using the signaling information included in the preamble at step S230.

Furthermore, in the broadcast signal transmission/reception method according to the embodiment of the present invention, core layer data is restored from the received signal at step S240.

Furthermore, in the broadcast signal transmission/reception method according to the embodiment of the present invention, enhanced layer data is restored via the cancellation of the core layer signal at step S250.

In particular, steps S240 and S250 shown in FIG. 2 may correspond to demultiplexing operations corresponding to step S210.

As will be described in detail later, step S210 shown in FIG. 2 may include generating a multiplexed signal by combining a core layer signal and an enhanced layer signal at different power levels; reducing the power of the multiplexed signal to a power level corresponding to the core layer signal; generating a time-interleaved signal by performing interleaving that is applied to both the core layer signal and the enhanced layer signal; and generating a broadcast signal frame including a bootstrap and a preamble using the time-interleaved signal. In this case, the broadcast signal transmission method of steps S210 and S220 may be viewed as including generating a multiplexed signal by combining a core layer signal and an enhanced layer signal at different power levels; reducing the power of the multiplexed signal to a power level corresponding to the core layer signal; generating a time-interleaved signal by performing interleaving that is applied to both the core layer signal and the enhanced layer signal; generating a broadcast signal frame including a bootstrap and a preamble using the time-interleaved signal; and transmitting the broadcast signal frame using an OFDM communication scheme through an antenna.

According to an embodiment, step S210 shown in FIG. 2 may include generating a time-interleaved signal by performing interleaving on a BICM output signal; and generating a broadcast signal frame including a bootstrap and a preamble using the time-interleaved signal. In this case, the bootstrap may include a symbol for signaling a BICM mode and OFDM parameters of L1-Basic of the preamble, together. In this case, the broadcast signal transmission method of steps S210 and S220 may be viewed as including generating a time-interleaved signal by performing interleaving on a BICM output signal; generating a broadcast signal frame including a bootstrap and a preamble using the time-interleaved signal; and transmitting the broadcast signal frame using an OFDM communication scheme through an antenna. In this case, the bootstrap may include a symbol for signaling a BICM mode and OFDM parameters of L1-Basic of the preamble, together.

As will be described in detail later, steps S240 and S250 shown in FIG. 2 may include generating a time-deinterleaved signal by applying time deinterleaving to a received signal corresponding to a broadcast signal frame; increasing the power of the received signal or the time-deinterleaved signal by a level corresponding to a reduction in power by the power normalizer of the transmitter; restoring core layer data from the power-adjusted signal; extracting an enhanced layer signal by performing cancellation corresponding to the core layer data on the power-adjusted signal; increasing the power of the enhanced layer signal by a level corresponding to a reduction in power by the injection level controller of the transmitter; and restoring enhanced layer data using the power-adjusted enhanced signal. In this case, a broadcast signal reception method according to an embodiment of the present invention may be viewed as including: generating a received signal by performing any one or more of synchronization, channel estimation and equalization on a transmitted signal corresponding to a broadcast signal frame; generating a time-deinterleaved signal by applying time deinterleaving to the received signal; increasing the power of the received signal or the time-deinterleaved signal by a level corresponding to a reduction in power by the power normalizer of the transmitter; restoring core layer data from the power-adjusted signal; extracting an enhanced layer signal by performing cancellation corresponding to the core layer data on the power-adjusted signal; increasing the power of the enhanced layer signal by a level corresponding to a reduction in power by the injection level controller of the transmitter; and restoring enhanced layer data using the power-adjusted enhanced layer signal.

Figure 3:
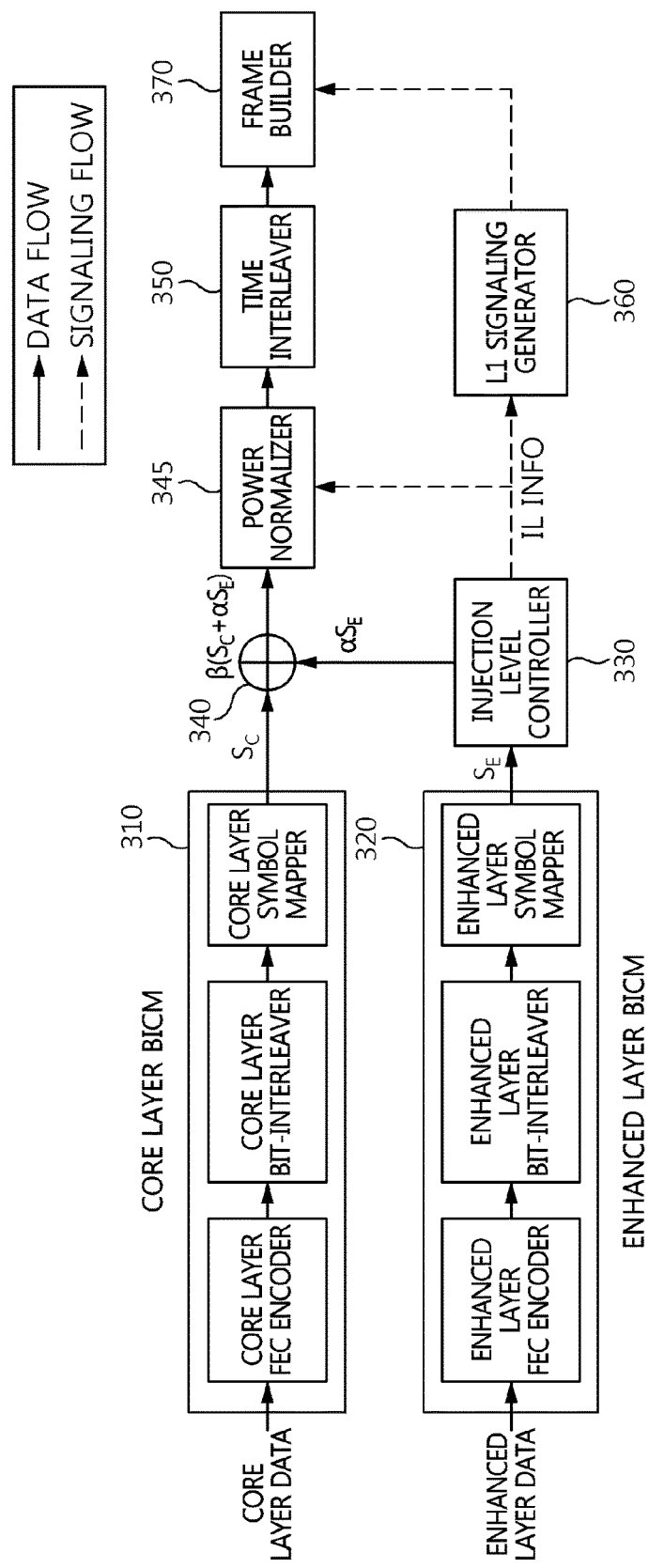
FIG. 3 is a block diagram showing an example of the apparatus for generating broadcast signal frame in FIG. 1.

FIG. 3 is a block diagram showing an example of the apparatus for generating broadcast signal frame in FIG. 1.

Referring to FIG. 3, the apparatus for generating broadcast signal frame according to an embodiment of the present invention may include a core layer BICM unit 310, an enhanced layer BICM unit 320, an injection level controller 330, a combiner 340, a power normalizer 345, and a time interleaver 350, a signaling generation unit 360, and a frame builder 370.

Generally, a BICM device includes an error correction encoder, a bit interleaver, and a symbol mapper. Each of the core layer BICM unit 310 and the enhanced layer BICM unit 320 shown in FIG. 3 may include an error correction encoder, a bit interleaver, and a symbol mapper. In particular, each of the error correction encoders (the core layer FEC encoder, and the enhanced layer FEC encoder) shown in FIG. 3 may be formed by connecting a BCH encoder and an LDPC encoder in series. In this case, the input of the error correction encoder is input to the BCH encoder, the output of the BCH encoder is input to the LDPC encoder, and the output of the LDPC encoder may be the output of the error correction encoder.

As shown in FIG. 3, core layer data and enhanced layer data pass through respective different BICM units, and are then combined by the combiner 340. That is, the term "Layered Division Multiplexing (LDM)" used herein may refer to combining the pieces of data of a plurality of layers into a single piece of data using differences in power and then transmitting the combined data.

That is, the core layer data passes through the core layer BICM unit 310, the enhanced layer data passes through the enhanced layer BICM unit 320 and then the injection level controller 330, and the core layer data and the enhanced layer data are combined by the combiner 340. In this case, the enhanced layer BICM unit 320 may perform BICM encoding different from that of the core layer BICM unit 310. That is, the enhanced layer BICM unit 320 may perform higher bit rate error correction encoding or symbol mapping than the core layer BICM unit 310. Furthermore, the enhanced layer BICM unit 320 may perform less robust error correction encoding or symbol mapping than the core layer BICM unit 310.

For example, the core layer error correction encoder may exhibit a lower bit rate than the enhanced layer error correction encoder. In this case, the enhanced layer symbol mapper may be less robust than the core layer symbol mapper.

The combiner 340 may be viewed as functioning to combine the core layer signal and the enhanced layer signal at different power levels. In an embodiment, power level adjustment may be performed on the core layer signal rather than the enhanced layer signal. In this case, the power of the core layer signal may be adjusted to be higher than the power of the enhanced layer signal.

The core layer data may use forward error correction (FEC) code having a low code rate in order to perform robust reception, while the enhanced layer data may use FEC code having a high code rate in order to achieve a high data transmission rate.

That is, the core layer data may have a broader coverage than the enhanced layer data in the same reception environment.

The enhanced layer data having passed through the enhanced layer BICM unit 320 is adjusted in gain (or power) by the injection level controller 330, and is combined with the core layer data by the combiner 340.

That is, the injection level controller 330 generates a power-reduced enhanced layer signal by reducing the power of the enhanced layer signal. In this case, the magnitude of the signal adjusted by the injection level controller 330 may be determined based on an injection level. In this case, an injection level in the case where signal B is inserted into signal A may be defined by Equation 1 below:

$$\text{Injection level (dB)} = -10 \log_{10}\left(\frac{\text{Signal power of } B}{\text{Signal power of } A}\right) \quad (1)$$

For example, assuming that the injection level is 3 dB when the enhanced layer signal is inserted into the core layer signal, Equation 1 means that the enhanced layer signal has power corresponding to half of the power of the core layer signal.

In this case, the injection level controller 330 may adjust the power level of the enhanced layer signal from 3.0 dB to 10.0 dB in steps of 0.5 dB.

In general, transmission power that is assigned to the core layer is higher than transmission power that is assigned to the enhanced layer, which enables the receiver to decode core layer data first.

In this case, the combiner 340 may be viewed as generating a multiplexed signal by combining the core layer signal with the power-reduced enhanced layer signal.

The signal obtained by the combination of the combiner 340 is provided to the power normalizer 345 so that the power of the signal can be reduced by a power level corresponding to an increase in power caused by the combination of the core layer signal and the enhanced layer signal, and then power adjustment is performed. That is, the power normalizer 345 reduces the power of the signal, obtained by the multiplexing of the combiner 340, to a power level corresponding to the core layer signal. Since the level of the combined signal is higher than the level of one layer signal, the power normalizing of the power normalizer 345 is required in order to prevent amplitude clipping, etc. in the remaining portion of a broadcast signal transmission/reception system.

In this case, the power normalizer 345 may adjust the magnitude of the combined signal to an appropriate value by multiplying the magnitude of the combined signal by the normalizing factor of Equation 2 below. Injection level information used to calculate Equation 2 below may be transferred to the power normalizer 345 via a signaling flow:

$$\text{Normalizing factor} = (\sqrt{(1+10^{-Injectionlevel(dB)/10})})^{-1} \quad (2)$$

Assuming that the power levels of the core layer signal and the enhanced layer signal are normalized to 1 when an enhanced layer signal $S_E$ is injected into a core layer signal $S_C$ at a preset injection level, a combined signal may be expressed by $S_C + \alpha S_E$.

In this case, $\alpha$ is scaling factors corresponding to various injection levels. That is, the injection level controller 330 may correspond to the scaling factor.

For example, when the injection level of an enhanced layer is 3 dB, a combined signal may be expressed by $$S_C + \sqrt{\frac{1}{2}} S_E.$$

Since the power of a combined signal (a multiplexed signal) increases compared to a core layer signal, the power normalizer 345 needs to mitigate the increase in power.

The output of the power normalizer 345 may be expressed by $\beta(S_C + \alpha S_E)$.

In this case, $\beta$ is normalizing factors based on various injection levels of the enhanced layer.

When the injection level of the enhanced layer is 3 dB, the power of the combined signal is increased by 50% compared to that of the core layer signal. Accordingly, the output of the power normalizer 345 may be expressed by $$\sqrt{\frac{2}{3}}\left(S_C + \sqrt{\frac{1}{2}} S_E\right).$$

The relationships among the injection level, the scaling factor $\alpha$ and the normalizing factor $\beta$ may be defined by Equation 3 below:

$$\begin{cases} \alpha = 10^{\left(\frac{-Injection\ level}{20}\right)} \\ \beta = \frac{1}{\sqrt{1+\alpha^2}} \end{cases} \quad (3)$$

That is, the power normalizer 345 corresponds to the normalizing factor, and reduces the power of the multiplexed signal by a level by which the combiner 340 has increased the power.

In this case, each of the normalizing factor and the scaling factor may be a rational number that is larger than 0 and smaller than 1.

In this case, the scaling factor may decrease as a reduction in power corresponding to the injection level controller 330 becomes larger, and the normalizing factor may increase as a reduction in power corresponding to the injection level controller 330 becomes larger.

The power normalized signal passes through the time interleaver 350 for distributing burst errors occurring over a channel.

In this case, the time interleaver 350 may be viewed as performing interleaving that is applied to both the core layer signal and the enhanced layer signal. That is, the core layer and the enhanced layer share the time interleaver, thereby preventing the unnecessary use of memory and also reducing latency at the receiver.

Although will be described later in greater detail, the enhanced layer signal may correspond to enhanced layer data restored based on cancellation corresponding to the restoration of core layer data corresponding to the core layer signal. The combiner 340 may combine one or more extension layer signals having power levels lower than those of the core layer signal and the enhanced layer signal with the core layer signal and the enhanced layer signal.

Meanwhile, L1 signaling information including injection level information is encoded by the signaling generation unit 360 including signaling-dedicated BICM. In this case, the signaling generation unit 360 may receive injection level information IL INFO from the injection level controller 330, and may generate an L1 signaling signal.

In L1 signaling, L1 refers to Layer-1 in the lowest layer of the ISO 7 layer model. In this case, the L1 signaling may be included in a preamble.

In general, the L1 signaling may include an FFT size, a guard interval size, etc., i.e., the important parameters of the OFDM transmitter, a channel code rate, modulation information, etc., i.e., BICM important parameters. This L1 signaling signal is combined with data signal into a broadcast signal frame.

The frame builder 370 generates a broadcast signal frame by combining the L1 signaling signal with a data signal. In this case, the frame builder 370 may generate the broadcast signal frame including a bootstrap and a preamble using the time interleaved signal.

In this case, the frame builder 370 may include a bootstrap generator configured to generate the bootstrap, a preamble generator configured to generate the preamble, and a data payload generator configured to generate a data payload corresponding to the time-interleaved signal. In this case, the data payload may be a super-imposed payload.

The enhanced layer BICM unit 320, the injection level controller 330, the combiner 340 and the power normalizer 345 may be omitted in case of a single layer. In this case, the time interleaver 350 may generate the time-interleaved signal by performing interleaving on the BICM output signal from the core layer BICM unit 310. Moreover, the fame builder 370 generates a broadcast signal frame which includes a bootstrap and a preamble using the time-interleaved signal. In this case, the bootstrap may include a symbol for signaling a BICM mode and OFDM parameters of L1-Basic of the preamble, together.

In this case, the symbol may correspond to a fixed-length bit string signaling the BICM mode of the L1-Basic along with the OFDM parameters of the L1-Basic.

In this case, the fixed-length bit string may be a bit string capable of identifying 256 combinations. That is, the fixed-length bit string may correspond to 8 bits.

In this case, the OFDM parameters may correspond to a combination of a FFT size, a guard interval length and a pilot pattern.

In this case, the BICM mode may include a first mode, a second mode and a third mode for identifying QPSK and a code rate of 3/15, a fourth mode for identifying 16-NUC (Non Uniform Constellation) and a code rate of 3/15, and a fifth mode for identifying 64-NUC (Non Uniform Constellation) and a code rate of 3/15.

In this case, the OFDM parameters may support all combinations of FFT sizes and guard interval lengths corresponding to data symbols for each of the first mode, the second mode, the third mode, the fourth mode and the fifth mode, and may correspond to 32 selected pilot patterns which are generated by selecting one or two among pilot patterns corresponding to each of the all combinations.

In this case, the first mode may correspond to a mode in which the parity repetition is performed, and the second and third modes may correspond to a mode in which the parity repetition is not performed.

In this case, the parity puncturing size of the second mode may be larger than the parity puncturing size of the first mode and be smaller than the parity puncturing size of the third mode.

In this case, the symbol may correspond to a lookup table in which a preamble structure corresponding to a second guard interval length is allocated prior to a preamble structure corresponding to a first guard interval length, the second guard interval length being shorter than the first guard interval length when the FFT sizes corresponding to the OFDM parameters are the same.

In this case, the symbol may correspond to a lookup table in which the first mode, the second mode, the third mode, the fourth mode and the fifth mode are allocated in an order of robustness for the same combination of a FFT size, a guard interval length and a pilot pattern.

In this case, the bootstrap may be shorter than the preamble, and have a fixed length.

In this case, the preamble may include L1-Basic and L1-Detail, and the bootstrap may include a symbol for representing a structure of the L1-Basic.

In this case, the BICM mode may correspond to constellation (modulation scheme)/code rate.

The broadcast signal frame may be transmitted via the OFDM transmitter that is robust to a multi-path and the Doppler phenomenon. In this case, the OFDM transmitter may be viewed as being responsible for the transmission signal generation of the next generation broadcasting system.

Figure 4:
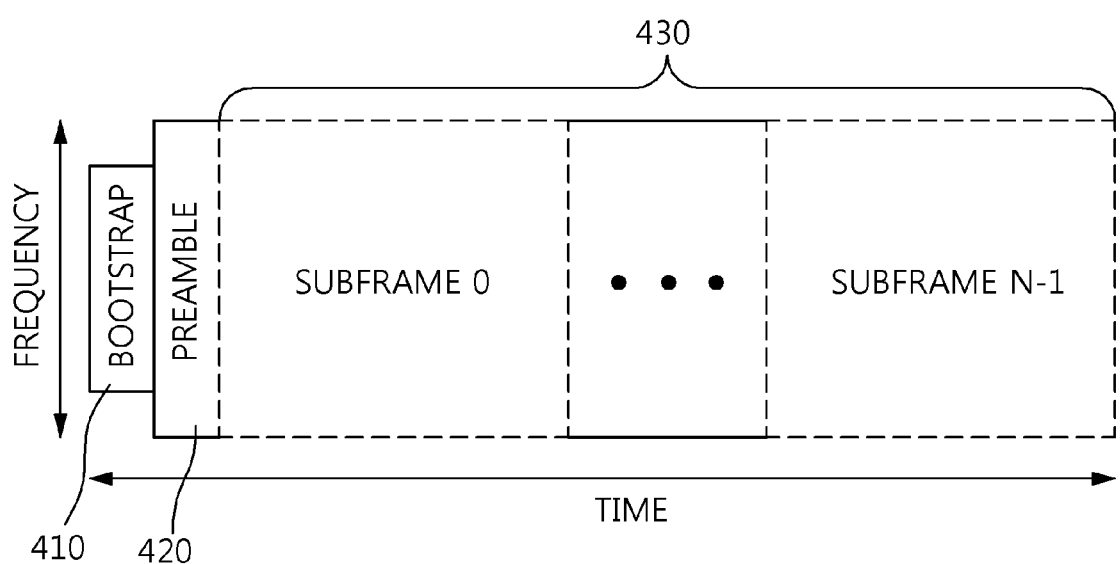
FIG. 4 is a diagram showing an example of the structure of a broadcast signal frame.

FIG. 4 is a diagram showing an example of the structure of a broadcast signal frame.

Referring to FIG. 4, a broadcast signal frame includes the bootstrap 410, the preamble 420 and the data payload 430. In this case, the data payload 430 may be a super-imposed payload.

The frame shown in FIG. 4, may be included in the super-frame.

In this case, the broadcast signal frame may include at least one of OFDM symbols. The broadcast signal frame may include a reference symbol or a pilot symbol.

The frame structure in which the Layered Division Multiplexing (LDM) is applied includes the bootstrap 410, the preamble 420 and the super-imposed payload 430 as shown in FIG. 4.

In this case, the bootstrap 410 and the preamble 420 may be seen as the two hierarchical preambles.

In this case, the bootstrap 410 may have a shorter length than the preamble 420 for the fast acquisition and detection. In this case, the bootstrap 410 may have a fixed-length. In this case, the bootstrap may include a fixed-length symbol. For example, the bootstrap 410 may consist of four OFDM symbols each of which has 0.5 ms length so that the bootstrap 410 may correspond to the fixed time length of 2 ms.

In this case, the bootstrap 410 may have a fixed bandwidth, and the preamble 420 and the super-imposed payload 430 may have a variable bandwidth wider than the bootstrap 410.

The preamble 420 may transmit detailed signaling information using a robust LDPC code. In this case, the length of the preamble 420 can be varied according to the signaling information.

In this case, both the bootstrap 410 and the payload 430 may be seen as a common signal which is shared by a plurality of layers.

The super-imposed payload 430 may correspond to a multiplexed signal of at least two layer signals. In this case, the super-imposed payload 430 may be generated by combining a core layer payload and an enhanced layer payload at different power levels. In this case, the core layer payload may include am in-band signaling section. In this case, the in-band signaling section may include signaling information for the enhanced layer service.

In this case, the bootstrap 410 may include a symbol representing a preamble structure.

In this case, the symbol which included in the bootstrap for representing the preamble structure may be set as shown in the Table 1 below.

TABLE 1

| preamble_structure | L1-Basic Mode | FFT Size | GI Length (samples) | Pilot Pattern (DX) |
|---|---|---|---|---|
| 0 | L1-Basic Mode 1 | 8192 | 2048 | 3 |
| 1 | L1-Basic Mode 1 | 8192 | 1536 | 4 |
| 2 | L1-Basic Mode 1 | 8192 | 1024 | 3 |
| 3 | L1-Basic Mode 1 | 8192 | 768 | 4 |
| 4 | L1-Basic Mode 1 | 16384 | 4096 | 3 |
| 5 | L1-Basic Mode 1 | 16384 | 3648 | 4 |
| 6 | L1-Basic Mode 1 | 16384 | 2432 | 3 |
| 7 | L1-Basic Mode 1 | 16384 | 1536 | 4 |
| 8 | L1-Basic Mode 1 | 16384 | 1024 | 6 |
| 9 | L1-Basic Mode 1 | 16384 | 768 | 8 |
| 10 | L1-Basic Mode 1 | 32768 | 4864 | 3 |
| 11 | L1-Basic Mode 1 | 32768 | 3648 | 3 |
| 12 | L1-Basic Mode 1 | 32768 | 3648 | 8 |
| 13 | L1-Basic Mode 1 | 32768 | 2432 | 6 |
| 14 | L1-Basic Mode 1 | 32768 | 1536 | 8 |
| 15 | L1-Basic Mode 1 | 32768 | 1024 | 12 |
| 16 | L1-Basic Mode 1 | 32768 | 768 | 16 |
| 17 | L1-Basic Mode 2 | 8192 | 2048 | 3 |
| 18 | L1-Basic Mode 2 | 8192 | 1536 | 4 |
| 19 | L1-Basic Mode 2 | 8192 | 1024 | 3 |
| 20 | L1-Basic Mode 2 | 8192 | 768 | 4 |
| 21 | L1-Basic Mode 2 | 16384 | 4096 | 3 |
| 22 | L1-Basic Mode 2 | 16384 | 3648 | 4 |
| 23 | L1-Basic Mode 2 | 16384 | 2432 | 3 |
| 24 | L1-Basic Mode 2 | 16384 | 1536 | 4 |
| 25 | L1-Basic Mode 2 | 16384 | 1024 | 6 |
| 26 | L1-Basic Mode 2 | 16384 | 768 | 8 |
| 27 | L1-Basic Mode 2 | 32768 | 4864 | 3 |
| 28 | L1-Basic Mode 2 | 32768 | 3648 | 3 |
| 29 | L1-Basic Mode 2 | 32768 | 3648 | 8 |
| 30 | L1-Basic Mode 2 | 32768 | 2432 | 6 |
| 31 | L1-Basic Mode 2 | 32768 | 1536 | 8 |
| 32 | L1-Basic Mode 2 | 32768 | 1024 | 12 |
| 33 | L1-Basic Mode 2 | 32768 | 768 | 16 |
| 34 | L1-Basic Mode 3 | 8192 | 2048 | 3 |
| 35 | L1-Basic Mode 3 | 8192 | 1536 | 4 |
| 36 | L1-Basic Mode 3 | 8192 | 1024 | 3 |
| 37 | L1-Basic Mode 3 | 8192 | 768 | 4 |
| 38 | L1-Basic Mode 3 | 16384 | 4096 | 3 |
| 39 | L1-Basic Mode 3 | 16384 | 3648 | 4 |
| 40 | L1-Basic Mode 3 | 16384 | 2432 | 3 |
| 41 | L1-Basic Mode 3 | 16384 | 1536 | 4 |
| 42 | L1-Basic Mode 3 | 16384 | 1024 | 6 |
| 43 | L1-Basic Mode 3 | 16384 | 768 | 8 |
| 44 | L1-Basic Mode 3 | 32768 | 4864 | 3 |
| 45 | L1-Basic Mode 3 | 32768 | 3648 | 3 |
| 46 | L1-Basic Mode 3 | 32768 | 3648 | 8 |
| 47 | L1-Basic Mode 3 | 32768 | 2432 | 6 |
| 48 | L1-Basic Mode 3 | 32768 | 1536 | 8 |
| 49 | L1-Basic Mode 3 | 32768 | 1024 | 12 |
| 50 | L1-Basic Mode 3 | 32768 | 768 | 16 |
| 51 | L1-Basic Mode 4 | 8192 | 2048 | 3 |
| 52 | L1-Basic Mode 4 | 8192 | 1536 | 4 |
| 53 | L1-Basic Mode 4 | 8192 | 1024 | 3 |
| 54 | L1-Basic Mode 4 | 8192 | 768 | 4 |
| 55 | L1-Basic Mode 4 | 16384 | 4096 | 3 |
| 56 | L1-Basic Mode 4 | 16384 | 3648 | 4 |
| 57 | L1-Basic Mode 4 | 16384 | 2432 | 3 |
| 58 | L1-Basic Mode 4 | 16384 | 1536 | 4 |
| 59 | L1-Basic Mode 4 | 16384 | 1024 | 6 |
| 60 | L1-Basic Mode 4 | 16384 | 768 | 8 |
| 61 | L1-Basic Mode 4 | 32768 | 4864 | 3 |
| 62 | L1-Basic Mode 4 | 32768 | 3648 | 3 |
| 63 | L1-Basic Mode 4 | 32768 | 3648 | 8 |
| 64 | L1-Basic Mode 4 | 32768 | 2432 | 6 |
| 65 | L1-Basic Mode 4 | 32768 | 1536 | 8 |
| 66 | L1-Basic Mode 4 | 32768 | 1024 | 12 |
| 67 | L1-Basic Mode 4 | 32768 | 768 | 16 |
| 68 | L1-Basic Mode 5 | 8192 | 2048 | 3 |
| 69 | L1-Basic Mode 5 | 8192 | 1536 | 4 |
| 70 | L1-Basic Mode 5 | 8192 | 1024 | 3 |
| 71 | L1-Basic Mode 5 | 8192 | 768 | 4 |
| 72 | L1-Basic Mode 5 | 16384 | 4096 | 3 |
| 73 | L1-Basic Mode 5 | 16384 | 3648 | 4 |
| 74 | L1-Basic Mode 5 | 16384 | 2432 | 3 |
| 75 | L1-Basic Mode 5 | 16384 | 1536 | 4 |

TABLE 1-continued

| preamble_structure | L1-Basic Mode | FFT Size | GI Length (samples) | Pilot Pattern (DX) |
|---|---|---|---|---|
| 76 | L1-Basic Mode 5 | 16384 | 1024 | 6 |
| 77 | L1-Basic Mode 5 | 16384 | 768 | 8 |
| 78 | L1-Basic Mode 5 | 32768 | 4864 | 3 |
| 79 | L1-Basic Mode 5 | 32768 | 3648 | 3 |
| 80 | L1-Basic Mode 5 | 32768 | 3648 | 8 |
| 81 | L1-Basic Mode 5 | 32768 | 2432 | 6 |
| 82 | L1-Basic Mode 5 | 32768 | 1536 | 8 |
| 83 | L1-Basic Mode 5 | 32768 | 1024 | 12 |
| 84 | L1-Basic Mode 5 | 32768 | 768 | 16 |
| 85 | L1-Basic Mode 6 | 8192 | 2048 | 3 |
| 86 | L1-Basic Mode 6 | 8192 | 1536 | 4 |
| 87 | L1-Basic Mode 6 | 8192 | 1024 | 3 |
| 88 | L1-Basic Mode 6 | 8192 | 768 | 4 |
| 89 | L1-Basic Mode 6 | 16384 | 4096 | 3 |
| 90 | L1-Basic Mode 6 | 16384 | 3648 | 4 |
| 91 | L1-Basic Mode 6 | 16384 | 2432 | 3 |
| 92 | L1-Basic Mode 6 | 16384 | 1536 | 4 |
| 93 | L1-Basic Mode 6 | 16384 | 1024 | 6 |
| 94 | L1-Basic Mode 6 | 16384 | 768 | 8 |
| 95 | L1-Basic Mode 6 | 32768 | 4864 | 3 |
| 96 | L1-Basic Mode 6 | 32768 | 3648 | 3 |
| 97 | L1-Basic Mode 6 | 32768 | 3648 | 8 |
| 98 | L1-Basic Mode 6 | 32768 | 2432 | 6 |
| 99 | L1-Basic Mode 6 | 32768 | 1536 | 8 |
| 100 | L1-Basic Mode 6 | 32768 | 1024 | 12 |
| 101 | L1-Basic Mode 6 | 32768 | 768 | 16 |
| 102 | L1-Basic Mode 7 | 8192 | 2048 | 3 |
| 103 | L1-Basic Mode 7 | 8192 | 1536 | 4 |
| 104 | L1-Basic Mode 7 | 8192 | 1024 | 3 |
| 105 | L1-Basic Mode 7 | 8192 | 768 | 4 |
| 106 | L1-Basic Mode 7 | 16384 | 4096 | 3 |
| 107 | L1-Basic Mode 7 | 16384 | 3648 | 4 |
| 108 | L1-Basic Mode 7 | 16384 | 2432 | 3 |
| 109 | L1-Basic Mode 7 | 16384 | 1536 | 4 |
| 110 | L1-Basic Mode 7 | 16384 | 1024 | 6 |
| 111 | L1-Basic Mode 7 | 16384 | 768 | 8 |
| 112 | L1-Basic Mode 7 | 32768 | 4864 | 3 |
| 113 | L1-Basic Mode 7 | 32768 | 3648 | 3 |
| 114 | L1-Basic Mode 7 | 32768 | 3648 | 8 |
| 115 | L1-Basic Mode 7 | 32768 | 2432 | 6 |
| 116 | L1-Basic Mode 7 | 32768 | 1536 | 8 |
| 117 | L1-Basic Mode 7 | 32768 | 1024 | 12 |
| 118 | L1-Basic Mode 7 | 32768 | 768 | 16 |
| 119 | Reserved | Reserved | Reserved | Reserved |
| 120 | Reserved | Reserved | Reserved | Reserved |
| 121 | Reserved | Reserved | Reserved | Reserved |
| 122 | Reserved | Reserved | Reserved | Reserved |
| 123 | Reserved | Reserved | Reserved | Reserved |
| 124 | Reserved | Reserved | Reserved | Reserved |
| 125 | Reserved | Reserved | Reserved | Reserved |
| 126 | Reserved | Reserved | Reserved | Reserved |
| 127 | Reserved | Reserved | Reserved | Reserved |

For example, a fixed-length symbol of 7-bit may be assigned for representing the preamble structure shown in the Table 1.

The L1-Basic Mode1, L1-Basic Mode 2 and L1-Basic Mode 3 in the Table 1 may correspond to QPSK and 3/15 LDPC.

In particular, the L1-Basic Mode 1 may correspond to 3/15, QPSK, parity repetition ON and a first puncturing size. The parity repetition and the parity puncturing are be explained later.

Moreover, the L1-Basic Mode 2 may correspond to 3/15, QPSK, parity repetition OFF and a second puncturing size which is larger than the first puncturing size.

Moreover, the L1-Basic Mode 3 may correspond to 3/15, QPSK, parity repetition OFF and a third puncturing size which is larger than the second puncturing size.

The L1 Basic Mode 4 in the Table 1 may correspond to 16-NUC (Non Uniform Constellation) and 3/15 LDPC.

The L1 Basic Mode 5 in the Table 1 may correspond to 64-NUC (Non Uniform Constellation) and 3/15 LDPC.

The L1-Basic Mode 6 and L1-Basic Mode 7 in the Table 1 may correspond to 256-NUC (Non Uniform Constellation) and 3/15 LDPC. Hereafter, the modulation scheme/code rate represents a combination of a modulation scheme and a code rate such as QPSK and 3/15 LDPC.

The FFT size in the Table 1 may represent a size of Fast Fourier Transform.

The GI length in the Table 1 may represent the Guard Interval Length, may represent a length of the guard interval which is not data in a time domain. In this case, the guard interval is longer, the system is more robust.

The Pilot Pattern in the Table 1 may represent Dx of the pilot pattern. Although it is not shown in the Table 1 explicitly, Dy may be all 1 in the example of Table 1 (The same applies to Table 2 below). For example, Dx=3 may mean that one pilot for channel estimation is included in x-axis direction in every three symbols. For example, Dy=1 may mean the pilot is included every time in y-axis direction.

In this case, Dx may correspond to the separation of pilot bearing carriers and Dy may correspond to the number of symbols forming one scattered pilot sequence.

As shown in the Table 1, the preamble structure corresponding to a second modulation scheme/code rate which is more robust than a first modulation scheme/code rate may be allocated in the lookup table prior to the preamble structure corresponding to the first modulation scheme/code rate.

In this case, the being allocated prior to other preamble structure may mean being stored in the lookup table corresponding to a serial number less than the serial number of the other preamble structure.

Furthermore, the preamble structure corresponding to a second FFT size which is shorter than a first FFT size may be allocated in the lookup table prior to the preamble structure corresponding to a first FFT size in case of the same modulation scheme/code rate.

Furthermore, the preamble structure corresponding to a second guard interval which is longer than a first guard interval may be allocated in the lookup table prior to the preamble structure corresponding to the first guard interval in case of the same modulation scheme/code rate and the same FFT size.

As shown in the Table 1, the setting of the order in which the preamble structures are assigned in the lookup table may make the recognition of the preamble structure using the bootstrap more efficient.

The Table 2 below is another example of the lookup table.

TABLE 2

| preamble_structure | FFT Size | GI Length (samples) | Preamble Pilot $D_X$ | L1-Basic FEC Mode |
|---|---|---|---|---|
| 0 | 8192 | 192 | 16 | L1-Basic Mode 1 |
| 1 | 8192 | 192 | 16 | L1-Basic Mode 2 |
| 2 | 8192 | 192 | 16 | L1-Basic Mode 3 |
| 3 | 8192 | 192 | 16 | L1-Basic Mode 4 |
| 4 | 8192 | 192 | 16 | L1-Basic Mode 5 |
| 5 | 8192 | 384 | 8 | L1-Basic Mode 1 |
| 6 | 8192 | 384 | 8 | L1-Basic Mode 2 |
| 7 | 8192 | 384 | 8 | L1-Basic Mode 3 |
| 8 | 8192 | 384 | 8 | L1-Basic Mode 4 |
| 9 | 8192 | 384 | 8 | L1-Basic Mode 5 |
| 10 | 8192 | 512 | 6 | L1-Basic Mode 1 |
| 11 | 8192 | 512 | 6 | L1-Basic Mode 2 |
| 12 | 8192 | 512 | 6 | L1-Basic Mode 3 |
| 13 | 8192 | 512 | 6 | L1-Basic Mode 4 |

TABLE 2-continued

| pre-amble_structure | FFT Size | GI Length (samples) | Preamble Pilot $D_X$ | L1-Basic FEC Mode |
|---|---|---|---|---|
| 14 | 8192 | 512 | 6 | L1-Basic Mode 5 |
| 15 | 8192 | 768 | 4 | L1-Basic Mode 1 |
| 16 | 8192 | 768 | 4 | L1-Basic Mode 2 |
| 17 | 8192 | 768 | 4 | L1-Basic Mode 3 |
| 18 | 8192 | 768 | 4 | L1-Basic Mode 4 |
| 19 | 8192 | 768 | 4 | L1-Basic Mode 5 |
| 20 | 8192 | 1024 | 3 | L1-Basic Mode 1 |
| 21 | 8192 | 1024 | 3 | L1-Basic Mode 2 |
| 22 | 8192 | 1024 | 3 | L1-Basic Mode 3 |
| 23 | 8192 | 1024 | 3 | L1-Basic Mode 4 |
| 24 | 8192 | 1024 | 3 | L1-Basic Mode 5 |
| 25 | 8192 | 1536 | 4 | L1-Basic Mode 1 |
| 26 | 8192 | 1536 | 4 | L1-Basic Mode 2 |
| 27 | 8192 | 1536 | 4 | L1-Basic Mode 3 |
| 28 | 8192 | 1536 | 4 | L1-Basic Mode 4 |
| 29 | 8192 | 1536 | 4 | L1-Basic Mode 5 |
| 30 | 8192 | 2048 | 3 | L1-Basic Mode 1 |
| 31 | 8192 | 2048 | 3 | L1-Basic Mode 2 |
| 32 | 8192 | 2048 | 3 | L1-Basic Mode 3 |
| 33 | 8192 | 2048 | 3 | L1-Basic Mode 4 |
| 34 | 8192 | 2048 | 3 | L1-Basic Mode 5 |
| 35 | 16384 | 192 | 32 | L1-Basic Mode 1 |
| 36 | 16384 | 192 | 32 | L1-Basic Mode 2 |
| 37 | 16384 | 192 | 32 | L1-Basic Mode 3 |
| 38 | 16384 | 192 | 32 | L1-Basic Mode 4 |
| 39 | 16384 | 192 | 32 | L1-Basic Mode 5 |
| 40 | 16384 | 384 | 16 | L1-Basic Mode 1 |
| 41 | 16384 | 384 | 16 | L1-Basic Mode 2 |
| 42 | 16384 | 384 | 16 | L1-Basic Mode 3 |
| 43 | 16384 | 384 | 16 | L1-Basic Mode 4 |
| 44 | 16384 | 384 | 16 | L1-Basic Mode 5 |
| 45 | 16384 | 512 | 12 | L1-Basic Mode 1 |
| 46 | 16384 | 512 | 12 | L1-Basic Mode 2 |
| 47 | 16384 | 512 | 12 | L1-Basic Mode 3 |
| 48 | 16384 | 512 | 12 | L1-Basic Mode 4 |
| 49 | 16384 | 512 | 12 | L1-Basic Mode 5 |
| 50 | 16384 | 768 | 8 | L1-Basic Mode 1 |
| 51 | 16384 | 768 | 8 | L1-Basic Mode 2 |
| 52 | 16384 | 768 | 8 | L1-Basic Mode 3 |
| 53 | 16384 | 768 | 8 | L1-Basic Mode 4 |
| 54 | 16384 | 768 | 8 | L1-Basic Mode 5 |
| 55 | 16384 | 1024 | 6 | L1-Basic Mode 1 |
| 56 | 16384 | 1024 | 6 | L1-Basic Mode 2 |
| 57 | 16384 | 1024 | 6 | L1-Basic Mode 3 |
| 58 | 16384 | 1024 | 6 | L1-Basic Mode 4 |
| 59 | 16384 | 1024 | 6 | L1-Basic Mode 5 |
| 60 | 16384 | 1536 | 4 | L1-Basic Mode 1 |
| 61 | 16384 | 1536 | 4 | L1-Basic Mode 2 |
| 62 | 16384 | 1536 | 4 | L1-Basic Mode 3 |
| 63 | 16384 | 1536 | 4 | L1-Basic Mode 4 |
| 64 | 16384 | 1536 | 4 | L1-Basic Mode 5 |
| 65 | 16384 | 2048 | 3 | L1-Basic Mode 1 |
| 66 | 16384 | 2048 | 3 | L1-Basic Mode 2 |
| 67 | 16384 | 2048 | 3 | L1-Basic Mode 3 |
| 68 | 16384 | 2048 | 3 | L1-Basic Mode 4 |
| 69 | 16384 | 2048 | 3 | L1-Basic Mode 5 |
| 70 | 16384 | 2432 | 3 | L1-Basic Mode 1 |
| 71 | 16384 | 2432 | 3 | L1-Basic Mode 2 |
| 72 | 16384 | 2432 | 3 | L1-Basic Mode 3 |
| 73 | 16384 | 2432 | 3 | L1-Basic Mode 4 |
| 74 | 16384 | 2432 | 3 | L1-Basic Mode 5 |
| 75 | 16384 | 3072 | 4 | L1-Basic Mode 1 |
| 76 | 16384 | 3072 | 4 | L1-Basic Mode 2 |
| 77 | 16384 | 3072 | 4 | L1-Basic Mode 3 |
| 78 | 16384 | 3072 | 4 | L1-Basic Mode 4 |
| 79 | 16384 | 3072 | 4 | L1-Basic Mode 5 |
| 80 | 16384 | 3648 | 4 | L1-Basic Mode 1 |
| 81 | 16384 | 3648 | 4 | L1-Basic Mode 2 |
| 82 | 16384 | 3648 | 4 | L1-Basic Mode 3 |
| 83 | 16384 | 3648 | 4 | L1-Basic Mode 4 |
| 84 | 16384 | 3648 | 4 | L1-Basic Mode 5 |
| 85 | 16384 | 4096 | 3 | L1-Basic Mode 1 |
| 86 | 16384 | 4096 | 3 | L1-Basic Mode 2 |
| 87 | 16384 | 4096 | 3 | L1-Basic Mode 3 |
| 88 | 16384 | 4096 | 3 | L1-Basic Mode 4 |
| 89 | 16384 | 4096 | 3 | L1-Basic Mode 5 |
| 90 | 32768 | 192 | 32 | L1-Basic Mode 1 |
| 91 | 32768 | 192 | 32 | L1-Basic Mode 2 |
| 92 | 32768 | 192 | 32 | L1-Basic Mode 3 |
| 93 | 32768 | 192 | 32 | L1-Basic Mode 4 |
| 94 | 32768 | 192 | 32 | L1-Basic Mode 5 |
| 95 | 32768 | 384 | 32 | L1-Basic Mode 1 |
| 96 | 32768 | 384 | 32 | L1-Basic Mode 2 |
| 97 | 32768 | 384 | 32 | L1-Basic Mode 3 |
| 98 | 32768 | 384 | 32 | L1-Basic Mode 4 |
| 99 | 32768 | 384 | 32 | L1-Basic Mode 5 |
| 100 | 32768 | 512 | 24 | L1-Basic Mode 1 |
| 101 | 32768 | 512 | 24 | L1-Basic Mode 2 |
| 102 | 32768 | 512 | 24 | L1-Basic Mode 3 |
| 103 | 32768 | 512 | 24 | L1-Basic Mode 4 |
| 104 | 32768 | 512 | 24 | L1-Basic Mode 5 |
| 105 | 32768 | 768 | 16 | L1-Basic Mode 1 |
| 106 | 32768 | 768 | 16 | L1-Basic Mode 2 |
| 107 | 32768 | 768 | 16 | L1-Basic Mode 3 |
| 108 | 32768 | 768 | 16 | L1-Basic Mode 4 |
| 109 | 32768 | 768 | 16 | L1-Basic Mode 5 |
| 110 | 32768 | 1024 | 12 | L1-Basic Mode 1 |
| 111 | 32768 | 1024 | 12 | L1-Basic Mode 2 |
| 112 | 32768 | 1024 | 12 | L1-Basic Mode 3 |
| 113 | 32768 | 1024 | 12 | L1-Basic Mode 4 |
| 114 | 32768 | 1024 | 12 | L1-Basic Mode 5 |
| 115 | 32768 | 1536 | 8 | L1-Basic Mode 1 |
| 116 | 32768 | 1536 | 8 | L1-Basic Mode 2 |
| 117 | 32768 | 1536 | 8 | L1-Basic Mode 3 |
| 118 | 32768 | 1536 | 8 | L1-Basic Mode 4 |
| 119 | 32768 | 1536 | 8 | L1-Basic Mode 5 |
| 120 | 32768 | 2048 | 6 | L1-Basic Mode 1 |
| 121 | 32768 | 2048 | 6 | L1-Basic Mode 2 |
| 122 | 32768 | 2048 | 6 | L1-Basic Mode 3 |
| 123 | 32768 | 2048 | 6 | L1-Basic Mode 4 |
| 124 | 32768 | 2048 | 6 | L1-Basic Mode 5 |
| 125 | 32768 | 2432 | 6 | L1-Basic Mode 1 |
| 126 | 32768 | 2432 | 6 | L1-Basic Mode 2 |
| 127 | 32768 | 2432 | 6 | L1-Basic Mode 3 |
| 128 | 32768 | 2432 | 6 | L1-Basic Mode 4 |
| 129 | 32768 | 2432 | 6 | L1-Basic Mode 5 |
| 130 | 32768 | 3072 | 8 | L1-Basic Mode 1 |
| 131 | 32768 | 3072 | 8 | L1-Basic Mode 2 |
| 132 | 32768 | 3072 | 8 | L1-Basic Mode 3 |
| 133 | 32768 | 3072 | 8 | L1-Basic Mode 4 |
| 134 | 32768 | 3072 | 8 | L1-Basic Mode 5 |
| 135 | 32768 | 3072 | 3 | L1-Basic Mode 1 |
| 136 | 32768 | 3072 | 3 | L1-Basic Mode 2 |
| 137 | 32768 | 3072 | 3 | L1-Basic Mode 3 |
| 138 | 32768 | 3072 | 3 | L1-Basic Mode 4 |
| 139 | 32768 | 3072 | 3 | L1-Basic Mode 5 |
| 140 | 32768 | 3648 | 8 | L1-Basic Mode 1 |
| 141 | 32768 | 3648 | 8 | L1-Basic Mode 2 |
| 142 | 32768 | 3648 | 8 | L1-Basic Mode 3 |
| 143 | 32768 | 3648 | 8 | L1-Basic Mode 4 |
| 144 | 32768 | 3648 | 8 | L1-Basic Mode 5 |
| 145 | 32768 | 3648 | 3 | L1-Basic Mode 1 |
| 146 | 32768 | 3648 | 3 | L1-Basic Mode 2 |
| 147 | 32768 | 3648 | 3 | L1-Basic Mode 3 |
| 148 | 32768 | 3648 | 3 | L1-Basic Mode 4 |
| 149 | 32768 | 3648 | 3 | L1-Basic Mode 5 |
| 150 | 32768 | 4096 | 3 | L1-Basic Mode 1 |
| 151 | 32768 | 4096 | 3 | L1-Basic Mode 2 |
| 152 | 32768 | 4096 | 3 | L1-Basic Mode 3 |
| 153 | 32768 | 4096 | 3 | L1-Basic Mode 4 |
| 154 | 32768 | 4096 | 3 | L1-Basic Mode 5 |
| 155 | 32768 | 4864 | 3 | L1-Basic Mode 1 |
| 156 | 32768 | 4864 | 3 | L1-Basic Mode 2 |
| 157 | 32768 | 4864 | 3 | L1-Basic Mode 3 |
| 158 | 32768 | 4864 | 3 | L1-Basic Mode 4 |
| 159 | 32768 | 4864 | 3 | L1-Basic Mode 5 |
| 160-255 | Reserved | Reserved | Reserved | Reserved |

A fixed-length symbol of 8-bit may be assigned for representing the preamble structure shown in the Table 2.

The preamble structure corresponding to a second guard interval length which is shorter than a first guard interval length is allocated prior to a preamble structure corresponding to the first guard interval length when the FFT sizes corresponding to the OFDM parameters are the same as shown in Table 2. Moreover, the first mode, the second mode, the third mode, the fourth mode and the fifth mode are allocated in an order of robustness for the same combination of a FFT size, a guard interval length and a pilot pattern as shown in Table 2.

In this case, the OFDM parameters (combination of a FFT size, a guard interval and a pilot pattern) shown in Table 1 and Table 2 may correspond to the selection of the most robust scattered pilot pattern after deciding the FFT size and the guard interval length.

Unlike Table 1, the symbol corresponding to the fixed-length bit string may be 8-bit symbol in the example of Table 2. The receiver which receives a 8-bit symbol may identify the BICM mode and the OFDM parameters, together, from one 8-bit symbol as the BICM mode and the OFDM parameters are signaled together using the 8-bit symbol.

It can be seen that the 32 combinations of FFT sizes, guard interval lengths and pilot patterns corresponding to data symbols for each of L1-Basic Mode 1, L-Basic Mode 2, L1-Basic Mode 3, L1-Basic Mode 4 and L1-Basic Mode 5, are all supported in the example of Table 2 (32×5=160). In this case, data symbols and L1-Basic of the preamble may have the same preamble structure so that the transmission/reception complexity of the broadcasting communication system may be reduced and the efficiency of the system operation may be improved.

The assigning order of the lookup table in Table 1 or Table 2 may have a huge influence on the system performance. That is, the signaling signal recovery performance may be changed dramatically based on the assigning order because the errors can be occur in some bits of the signaling signal which received by a receiver.

Table 3 below is a table representing robustness of seven BICM modes of L1-Basic.

Referring the Table 3, L1-Detail is 1.5 dB more robust than the most robust data FEC and L1-Basic is 1.5 dB more robust than L1-Detail.

TABLE 3

|  | L1-Basic | L1-Detail | Most robust data FEC |
| --- | --- | --- | --- |
| L1-Basic Mode 1 | −9.2 dB | −7.7 dB | −6.2 dB |
| L1-Basic Mode 2 | −1.8 dB | −0.3 dB | 1.2 dB |
| L1-Basic Mode 3 | 1.2 dB | 2.7 dB | 4.2 dB |
| L1-Basic Mode 4 | 5.6 dB | 7.1 dB | 8.6 dB |
| L1-Basic Mode 5 | 9.9 dB | 11.4 dB | 12.9 dB |
| L1-Basic Mode 6 | 15.2 dB | 16.7 dB | 18.2 dB |
| L1-Basic Mode 7 | 22.6 dB | 24.1 dB | 25.6 dB |

Although each of seven BICM modes of L1-Basic is 1.5 dB more robust than L1-Detail in Table 3, L1-Basic Mode 1 and L1-Basic Mode 2 may correspond to −9.2 dB, L1-Basic Mode 3 and L-Basic Mode 4 may correspond to 1.2 dB and L-Basic Mode 5, L1-Basic Mode 6 and L1-Basic Mode 7 may correspond to 9.9 dB in accordance with an embodiment.

Table 4 below is a table representing combinations of FFT sizes, guard interval lengths and pilot patterns.

TABLE 4

| GI Length (samples) | 8K FFT | 16K FFT | 32K FFT |
| --- | --- | --- | --- |
| 192 | SP32_2, SP32_4, [SP16_2], SP16_4 | [SP32_2], SP32_4 | [SP32_2] |

TABLE 4-continued

| GI Length (samples) | 8K FFT | 16K FFT | 32K FFT |
| --- | --- | --- | --- |
| 384 | SP16_2, SP16_4, [SP8_2], SP8_4 | SP32_2, SP32_4, [SP16_2], SP16_4 | [SP32_2] |
| 512 | SP12_2, SP12_4, [SP6_2], SP6_4 | SP24_2, SP24_4, [SP12_2], SP12_4 | [SP24_2] |
| 768 | SP8_2, SP8_4, [SP4_2], SP4_4 | SP16_2, SP16_4, [SP8_2], SP8_4 | SP32_2, [SP16_2] |
| 1024 | SP6_2, SP6_4, [SP3_2], SP3_4 | SP12_2, SP12_4, [SP6_2], SP6_4 | SP24_2, [SP_12_2] |
| 1536 | [SP4_2], SP4_4 | SP8_2, SP8_4, [SP4_2], SP4_4 | SP16_2, [SP8_2] |
| 2048 | [SP3_2], SP3_4 | SP6_2, SP6_4, [SP3_2], SP3_4 | SP12_2, [SP6_2] |
| 2432 | N/A | SP6_2, SP6_4, [SP3_2], SP3_4 | SP12_2, [SP6_2] |
| 3072 | N/A | [SP4_2], SP4_4 | [SP8_2], [SP3_2] |
| 3648 | N/A | [SP4_2], SP4_4 | [SP8_2], [SP3_2] |
| 4096 | N/A | [SP3_2], SP3_4 | SP6_2, [SP3_2] |
| 4864 | N/A | N/A | SP6_2, [SP3_2] |

The 8K FFT correspond to 8192, the 16K FFT corresponds to 16384 and the 32K FFT corresponds to 32768 in Table 4.

Moreover, SP may represent Scattered Pattern and the number after SP may represent Dx in Table 4. For example, SP3_2 represents Dx=3, and SP6_2 represents Dx=6. Furthermore, the number after may represent Dy corresponding to the data symbol. For example, SP3_2 may represent Dy=2 in case of the data symbol and SP6_4 may represent Dy=4 in case of the data symbol.

The combinations of FFT sizes, guard interval lengths and pilot patterns in Table 4 may be all combinations corresponding to data symbols of the broadcasting system.

In this case, the OFDM parameters of the preamble may support 32 combinations of FFT sizes, guard interval lengths and pilot patterns for each of the five BICM modes L1-Basic Mode 1, L1-Basic Mode 2, L1-Basic Mode 3, L1-Basic Mode 4 and L1-Basic Mode 5. The pilot patterns corresponding to 32 combinations which are supported by the OFDM parameters of the preamble are highlighted with brackets [ ] in Table 4.

All cells not listed as N/A in Table 4 may represent all combinations of FFT sizes and guard interval lengths corresponding to data symbols. Moreover, the pilot patterns shown in data cells may correspond to pilot patterns which can be supported for the combination of the corresponding FFT size and the corresponding guard interval length in case of the data symbol.

The OFDM parameters of the preamble may correspond to 32 selected pilot patterns ([ ]) which are generated by selecting one or two among pilot patterns showed in each cell in Table 4. In this case, Dx of each selected pilot pattern may be a value in Table 4 but Dy may be always 1. For example, [SP4_2] may represent Dx=4 and Dy=2 for the data symbol but may represent Dx=4 and Dy=1 for the OFDM parameter. For example, [SP8_2] may represent Dx=8 and Dy=2 for the data symbol but may represent Dx=8 and Dy=1 for the OFDM parameter.

The pilot pattern corresponding to the least common multiple in each cell may be selected as the selected pilot pattern. That is, if there is a pilot pattern corresponding to the least common multiple of the pilot patterns supported by each cells, only one pilot pattern corresponding to the least common multiple may be selected as the selected pilot pattern. If there is no pilot pattern corresponding to the least common multiple among the pilot patterns supported by each cell, two or more selected pilot patterns may be selected.

In the example of Table 4, the combination of the guard interval length 3072 and the FFT size 32K, and the combination of the guard interval length 3648 and the FFT size 32K are cases in which two or more selected pilot patterns are selected.

The core layer data is demodulated using the signaling information and the enhanced layer signal is demodulated through the cancellation process corresponding to the core layer data. In this case, the cancellation corresponding to the core layer data will be described in detail later.

In this case, the signaling information may be L1 (Layer-1) signaling information. The L1 signaling information may include information for physical layer parameters.

Referring to FIG. 4, a broadcast signal frame includes an L1 signaling signal and a data signal. For example, the broadcast signal frame may be an ATSC 3.0 frame.

Figure 5:
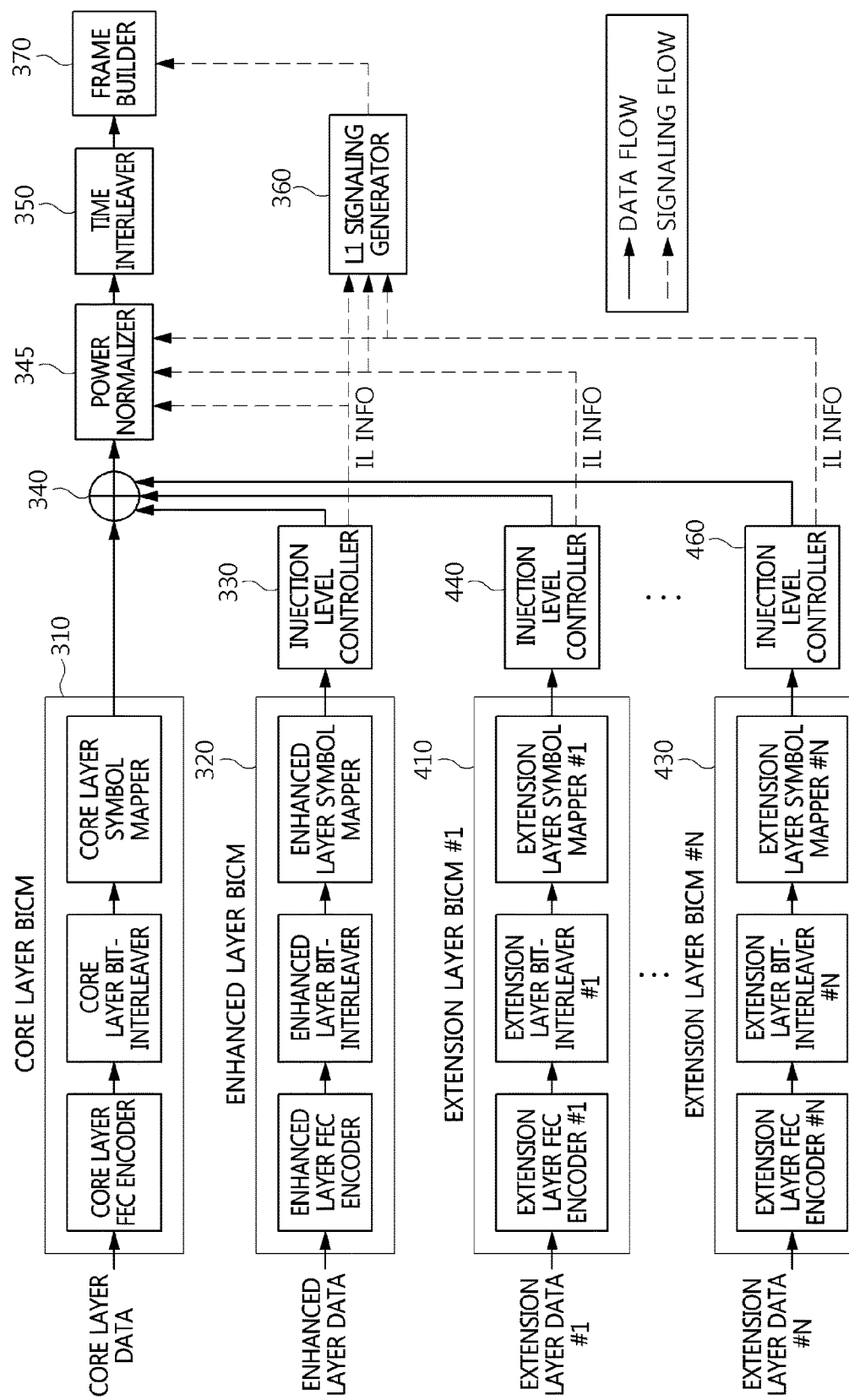
FIG. 5 is a block diagram showing another example of the apparatus for generating broadcast signal frame shown in FIG. 1.

FIG. 5 is a block diagram showing another example of the apparatus for generating broadcast signal frame shown in FIG. 1.

Referring to FIG. 5, it can be seen that an apparatus for generating broadcast signal frame multiplexes data corresponding to N (N is a natural number that is equal to or larger than 1) extension layers together in addition to core layer data and enhanced layer data.

That is, the apparatus for generating the broadcast signal frame in FIG. 5 includes N extension layer BICM units 410, . . . , 430 and injection level controllers 440, . . . , 460 in addition to a core layer BICM unit 310, an enhanced layer BICM unit 320, an injection level controller 330, a combiner 340, a power normalizer 345, a time interleaver 350, a signaling generation unit 360, and a frame builder 370.

The core layer BICM unit 310, enhanced layer BICM unit 320, injection level controller 330, combiner 340, power normalizer 345, time interleaver 350, signaling generation unit 360 and frame builder 370 shown in FIG. 5 have been described in detail with reference to FIG. 3.

Each of the N extension layer BICM units 410, . . . , 430 independently performs BICM encoding, and each of the injection level controllers 440, . . . , 460 performs power reduction corresponding to a corresponding extension layer, thereby enabling a power reduced extension layer signal to be combined with other layer signals via the combiner 340.

In this case, each of the error correction encoders of the extension layer BICM units 410, . . . , 430 may be formed by connecting a BCH encoder and an LDPC encoder in series.

In particular, it is preferred that a reduction in power corresponding to each of the injection level controllers 440, . . . , 460 be higher than the reduction in power of the injection level controller 330. That is, a lower one of the injection level controllers 330, 440, . . . , 460 shown in FIG. 5 may correspond to a larger reduction in power.

Injection level information provided by the injection level controllers 330, 440 and 460 shown in FIG. 5 is included in the broadcast signal frame of the frame builder 370 via the signaling generation unit 360, and is then transmitted to the receiver. That is, the injection level of each layer is contained in the L1 signaling information and then transferred to the receiver.

In the present invention, the adjustment of power may correspond to increasing or decreasing the power of an input signal, and may correspond to increasing or decreasing the gain of an input signal.

The power normalizer 345 mitigates an increase in power caused by the combination of a plurality of layer signals by means of the combiner 340.

In the example shown in FIG. 5, the power normalizer 345 may adjust the power of a signal to appropriate magnitude by multiplying the magnitude of a signal, into which the signals of the respective layers are combined, by a normalizing factor by using Equation 4 below:

$$\text{Normalizing factor} = \left( \sqrt{\begin{array}{l} (1 + 10^{-\textit{Injection level \#1(dB)}/10} + \\ 10^{-\textit{Injection level \#2(dB)}/10} + \cdots + \\ 10^{-\textit{Injection level \#(N+1)(dB)}/10}) \end{array}} \right)^{-1} \quad (4)$$

The time interleaver 350 performs interleaving equally applied to the signals of the layers by interleaving the signals combined by the combiner 340.

Figure 6:
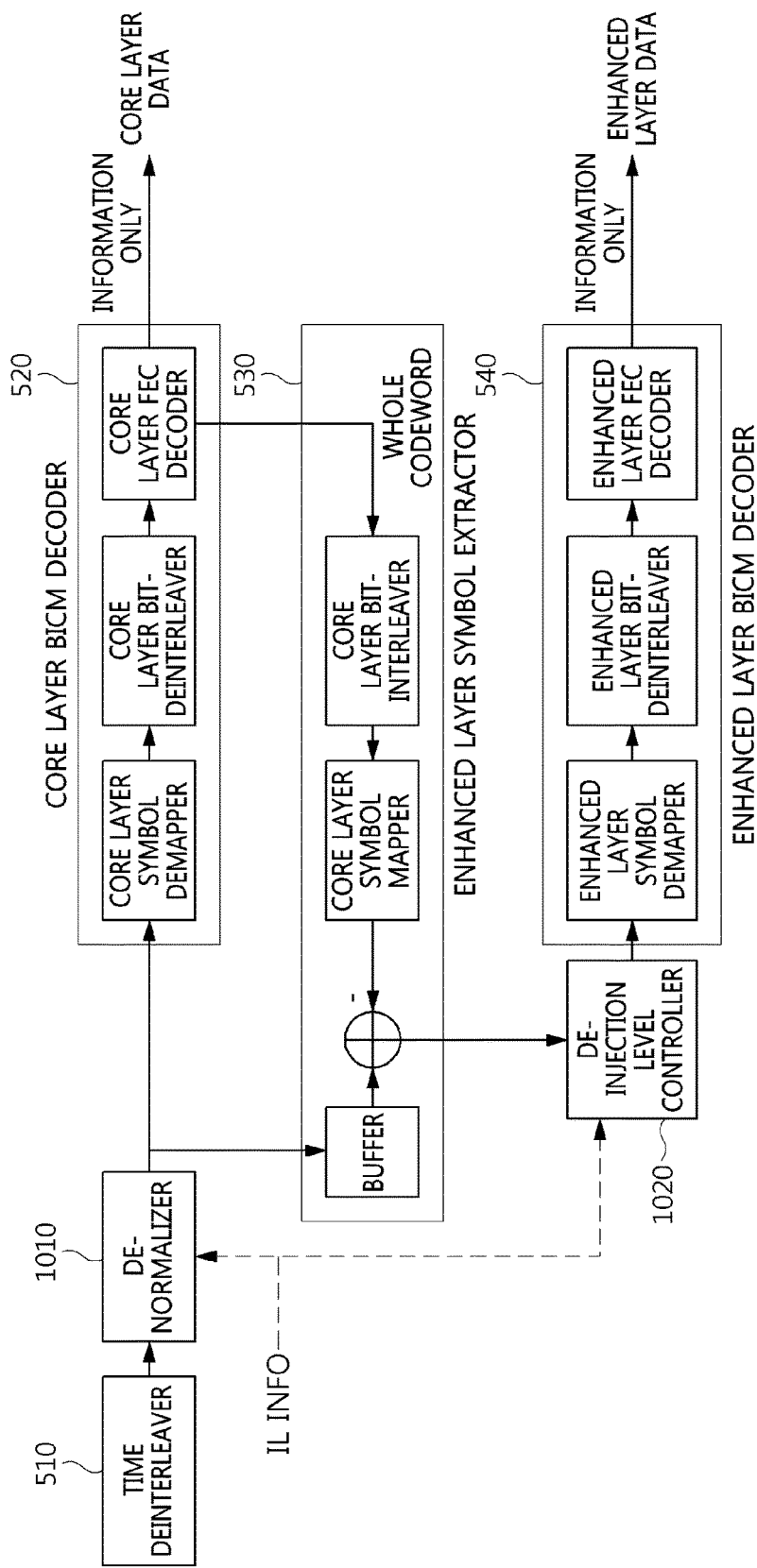
FIG. 6 is a block diagram showing an example of the signal demultiplexer shown in FIG. 1.

FIG. 6 is a block diagram showing still an example of the signal demultiplexer shown in FIG. 1.

Referring to FIG. 6, a signal demultiplexer according to an embodiment of the present invention includes a time deinterleaver 510, a de-normalizer 1010, core layer BICM decoder 520, an enhanced layer symbol extractor 530, a de-injection level controller 1020, and an enhanced layer BICM decoder 540.

In this case, the signal demultiplexer shown in FIG. 6 may correspond to the apparatus for generating the broadcast signal frame shown in FIG. 3.

The time deinterleaver 510 receives a received signal from an OFDM receiver for performing operations, such as time/frequency synchronization, channel estimation and equalization, and performs an operation related to the distribution of burst errors occurring over a channel. In this case, the L1 signaling information is decoded by the OFDM receiver first, and is then used for the decoding of data. In particular, the injection level information of the L1 signaling information may be transferred to the de-normalizer 1010 and the de-injection level controller 1020. In this case, the OFDM receiver may decode the received signal in the form of a broadcast signal frame, for example, an ATSC 3.0 frame, may extract the data symbol part of the frame, and may provide the extracted data symbol part to the time deinterleaver 510. That is, the time deinterleaver 510 distributes burst errors occurring over a channel by performing deinterleaving while passing a data symbol therethrough.

The de-normalizer 1010 corresponds to the power normalizer of the transmitter, and increases power by a level by which the power normalizer has decreased the power. That is, the de-normalizer 1010 divides the received signal by the normalizing factor of Equation 2.

Although the de-normalizer 1010 is illustrated as adjusting the power of the output signal of the time interleaver 510 in the example shown in FIG. 6, the de-normalizer 1010 may be located before the time interleaver 510 so that power adjustment is performed before interleaving in some embodiments.

That is, the de-normalizer 1010 may be viewed as being located before or after the time interleaver 510 and amplifying the magnitude of a signal for the purpose of the LLR calculation of the core layer symbol demapper.

The output of the time deinterleaver 510 (or the output of the de-normalizer 1010) is provided to the core layer BICM decoder 520, and the core layer BICM decoder 520 restores core layer data.

In this case, the core layer BICM decoder 520 includes a core layer symbol demapper, a core layer bit deinterleaver, and a core layer error correction decoder. The core layer symbol demapper calculates LLR values related to symbols, the core layer bit deinterleaver strongly mixes the calculated LLR values with burst errors, and the core layer error correction decoder corrects error occurring over a channel.

In this case, the core layer symbol demapper may calculate an LLR value for each bit using a predetermined constellation. In this case, the constellation used by the core layer symbol mapper may vary depending on the combination of the code rate and the modulation order that are used by the transmitter.

In this case, the core layer bit deinterleaver may perform deinterleaving on calculated LLR values on an LDPC code word basis.

In particular, the core layer error correction decoder may output only information bits, or may output all bits in which information bits have been mixed with parity bits. In this case, the core layer error correction decoder may output only information bits as core layer data, and may output all bits in which information bits have been mixed with parity bits to the enhanced layer symbol extractor 530.

The core layer error correction decoder may be formed by connecting a core layer LDPC decoder and a core layer BCH decoder in series. That is, the input of the core layer error correction decoder may be input to the core layer LDPC decoder, the output of the core layer LDPC decoder may be input to the core layer BCH decoder, and the output of the core layer BCH decoder may become the output of the core layer error correction decoder. In this case, the LDPC decoder performs LDPC decoding, and the BCH decoder performs BCH decoding.

Furthermore, the enhanced layer error correction decoder may be formed by connecting an enhanced layer LDPC decoder and an enhanced layer BCH decoder in series. That is, the input of the enhanced layer error correction decoder may be input to the enhanced layer LDPC decoder, the output of the enhanced layer LDPC decoder may be input to the enhanced layer BCH decoder, and the output of the enhanced layer BCH decoder may become the output of the enhanced layer error correction decoder.

The enhanced layer symbol extractor 530 may receive all bits from the core layer error correction decoder of the core layer BICM decoder 520, may extract enhanced layer symbols from the output signal of the time deinterleaver 510 or de-normalizer 1010. In an embodiment, the enhanced layer symbol extractor 530 may not be provided with all bits by the error correction decoder of the core layer BICM decoder 520, but may be provided with LDPC information bits or BCH information bits by the error correction decoder of the core layer BICM decoder 520.

In this case, the enhanced layer symbol extractor 530 includes a buffer, a subtracter, a core layer symbol mapper, and a core layer bit interleaver. The buffer stores the output signal of the time deinterleaver 510 or de-normalizer 1010. The core layer bit interleaver receives the all bits (information bits+parity bits) of the core layer BICM decoder, and performs the same core layer bit interleaving as the transmitter. The core layer symbol mapper generates core layer symbols, which are the same as the transmitter, from the interleaved signal. The subtracter obtains enhanced layer symbols by subtracting the output signal of the core layer symbol mapper from the signal stored in the buffer, and transfers the enhanced layer symbols to the de-injection level controller 1020. In particular, when LDPC information bits are provided, the enhanced layer symbol extractor 530 may further include a core layer LDPC encoder. Furthermore, when BCH information bits are provided, the enhanced layer symbol extractor 530 may further include not only a core layer LDPC encoder but also a core layer BCH encoder.

In this case, the core layer LDPC encoder, core layer BCH encoder, core layer bit interleaver and core layer symbol mapper included in the enhanced layer symbol extractor 530 may be the same as the LDPC encoder, BCH encoder, bit interleaver and symbol mapper of the core layer described with reference to FIG. 3.

The de-injection level controller 1020 receives the enhanced layer symbols, and increases the power of the input signal by a level by which the injection level controller of the transmitter has decreased the power. That is, the de-injection level controller 1020 amplifies the input signal, and provides the amplified input signal to the enhanced layer BICM decoder 540. For example, if at the transmitter, the power used to combine the enhanced layer signal is lower than the power used to combine the core layer signal by 3 dB, the de-injection level controller 1020 functions to increase the power of the input signal by 3 dB.

In this case, the de-injection level controller 1020 may be viewed as receiving injection level information from the OFDM receiver and multiplying an extracted enhanced layer signal by the enhanced layer gain of Equation 5:

$$\text{Enhanced layer gain} = (\sqrt{10^{-Injectionlevel(dB)/10}})^{-1} \qquad (5)$$

The enhanced layer BICM decoder 540 receives the enhanced layer symbol whose power has been increased by the de-injection level controller 1020, and restores the enhanced layer data.

In this case, the enhanced layer BICM decoder 540 may include an enhanced layer symbol demapper, an enhanced layer bit deinterleaver, and an enhanced layer error correction decoder. The enhanced layer symbol demapper calculates LLR values related to the enhanced layer symbols, the enhanced layer bit deinterleaver strongly mixes the calculated LLR values with burst errors, and the enhanced layer error correction decoder corrects error occurring over a channel.

Although the enhanced layer BICM decoder 540 performs a task similar to a task that is performed by the core layer BICM decoder 520, the enhanced layer LDPC decoder generally performs LDPC decoding related to a code rate equal to or higher than 6/15.

For example, the core layer may use LDPC code having a code rate equal to or higher than 5/15, and the enhanced layer may use LDPC code having a code rate equal to or higher than 6/15. In this case, in a reception environment in which enhanced layer data can be decoded, core layer data may be decoded using only a small number of LDPC decoding iterations. Using this characteristic, in the hardware of the receiver, a single LDPC decoder is shared by the core layer and the enhanced layer, and thus the cost required to implement the hardware can be reduced. In this case, the core layer LDPC decoder may use only some time resources (LDPC decoding iterations), and the enhanced layer LDPC decoder may use most time resources.

That is, the signal demultiplexer shown in FIG. 6 restores core layer data first, leaves only the enhanced layer symbols by cancellation the core layer symbols in the received signal symbols, and then restores enhanced layer data by increasing the power of the enhanced layer symbols. As described with reference to FIGS. 3 and 5, signals corresponding to respective layers are combined at different power levels, and thus data restoration having the smallest error can be achieved only if restoration starts with a signal combined with the strongest power.

Accordingly, in the example shown in FIG. 6, the signal demultiplexer may include the time deinterleaver 510 configured to generate a time-deinterleaved signal by applying time deinterleaving to a received signal; a de-normalizer 1010 configured to increase the power of the received signal or the time-deinterleaved signal by a level corresponding to a reduction in power by the power normalizer of the transmitter; the core layer BICM decoder 520 configured to restore core layer data from the signal power-adjusted by the de-normalizer 1010; the enhanced layer symbol extractor 530 configured to extract an enhanced layer signal by performing cancellation, corresponding to the core layer data, on the signal power-adjusted by the de-normalizer 1010 using the output signal of the core layer FEC decoder of the core layer BICM decoder 520; a de-injection level controller 1020 configured to increase the power of the enhanced layer signal by a level corresponding to a reduction in power by the injection power level controller of the transmitter; and an enhanced layer BICM decoder 540 configured to restore enhanced layer data using the output signal of the de-injection level controller 1020.

In this case, the enhanced layer symbol extractor may receive all code words from the core layer LDPC decoder of the core layer BICM decoder, and may immediately perform bit interleaving on the all code words.

In this case, the enhanced layer symbol extractor may receive information bits from the core layer LDPC decoder of the core layer BICM decoder, and may perform core layer LDPC encoding and then bit interleaving on the information bits.

In this case, the enhanced layer symbol extractor may receive information bits from the core layer BCH decoder of the core layer BICM decoder, and may perform core layer BCH encoding and core layer LDPC encoding and then bit interleaving on the information bits.

In this case, the de-normalizer and the de-injection level controller may receive injection level information IL INFO provided based on L1 signaling, and may perform power control based on the injection level information.

In this case, the core layer BICM decoder may have a bit rate lower than that of the enhanced layer BICM decoder, and may be more robust than the enhanced layer BICM decoder.

In this case, the de-normalizer may correspond to the reciprocal of the normalizing factor.

In this case, the de-injection level controller may correspond to the reciprocal of the scaling factor.

In this case, the enhanced layer data may be restored based on cancellation corresponding to the restoration of core layer data corresponding to the core layer signal.

In this case, the signal demultiplexer further may include one or more extension layer symbol extractors each configured to extract an extension layer signal by performing cancellation corresponding to previous layer data; one or more de-injection level controllers each configured to increase the power of the extension layer signal by a level corresponding to a reduction in power by the injection level controller of the transmitter; and one or more extension layer BICM decoders configured to restore one or more pieces of extension layer data using the output signals of the one or more de-injection level controllers.

From the configuration shown in FIG. 6, it can be seen that a signal demultiplexing method according to an embodiment of the present invention includes generating a time-deinterleaved signal by applying time deinterleaving to a received signal; increasing the power of the received signal or the time-deinterleaved signal by a level corresponding to a reduction in power by the power normalizer of the transmitter; restoring core layer data from the power-adjusted signal; extracting an enhanced layer signal by performing cancellation, corresponding to the core layer data, on the power-adjusted signal; increasing the power of the enhanced layer signal by a level corresponding to a reduction in power by the injection power level controller of the transmitter; and restoring enhanced layer data using the enhanced layer data.

In this case, extracting the enhanced layer signal may include receiving all code words from the core layer LDPC decoder of the core layer BICM decoder, and immediately performing bit interleaving on the all code words.

In this case, extracting the enhanced layer signal may include receiving information bits from the core layer LDPC decoder of the core layer BICM decoder, and performing core layer LDPC encoding and then bit interleaving on the information bits.

In this case, extracting the enhanced layer signal may include receiving information bits from the core layer BCH decoder of the core layer BICM decoder, and performing core layer BCH encoding and core layer LDPC encoding and then bit interleaving on the information bits.

Figure 7:
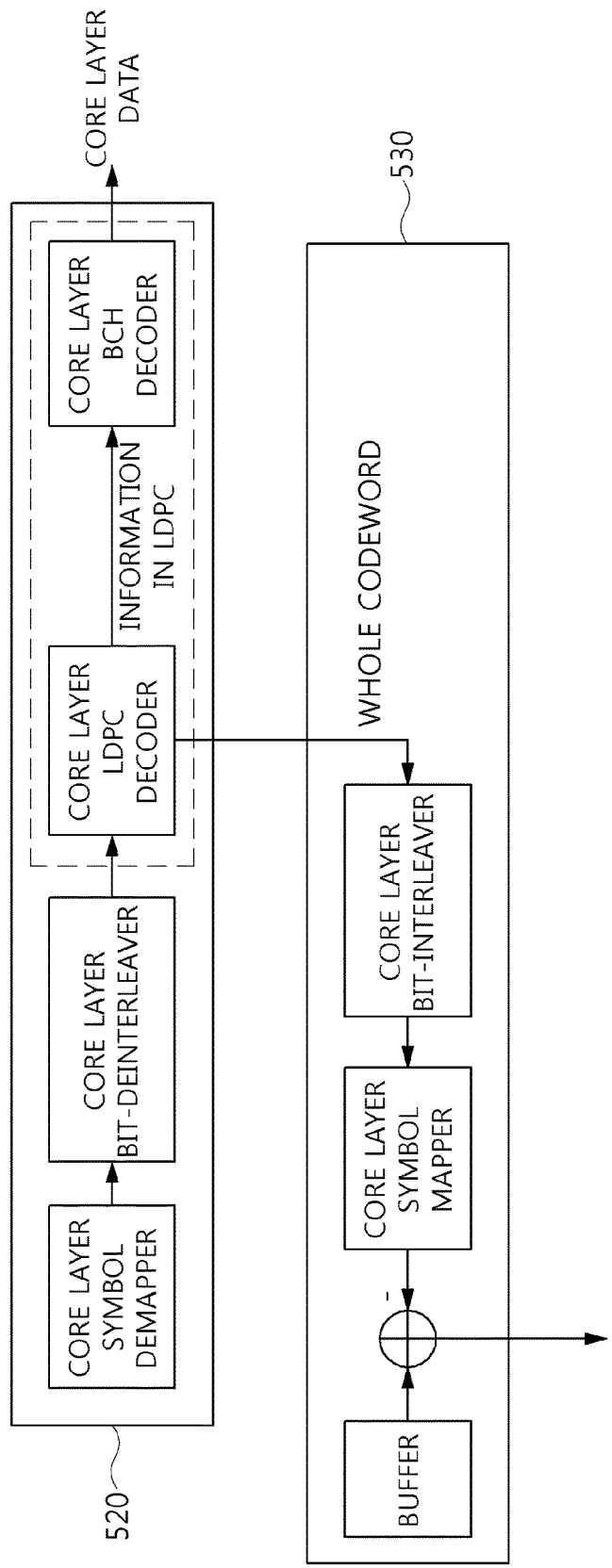
FIG. 7 is a block diagram showing an example of the core layer BICM decoder and the enhanced layer symbol extractor shown in FIG. 6.

FIG. 7 is a block diagram showing an example of the core layer BICM decoder 520 and the enhanced layer symbol extractor 530 shown in FIG. 6.

Referring to FIG. 7, the core layer BICM decoder 520 includes a core layer symbol demapper, a core layer bit deinterleaver, a core layer LDPC decoder, and a core layer BCH decoder.

That is, in the example shown in FIG. 7, the core layer error correction decoder includes the core layer LDPC decoder and the core layer BCH decoder.

Furthermore, in the example shown in FIG. 7, the core layer LDPC decoder provides all code words, including parity bits, to the enhanced layer symbol extractor 530. That is, although the LDPC decoder generally outputs only the information bits of all the LDPC code words, the LDPC decoder may output all the code words.

In this case, although the enhanced layer symbol extractor 530 may be easily implemented because it does not need to include a core layer LDPC encoder or a core layer BCH encoder, there is a possibility that a residual error may remain in the LDPC code parity part.

Figure 8:
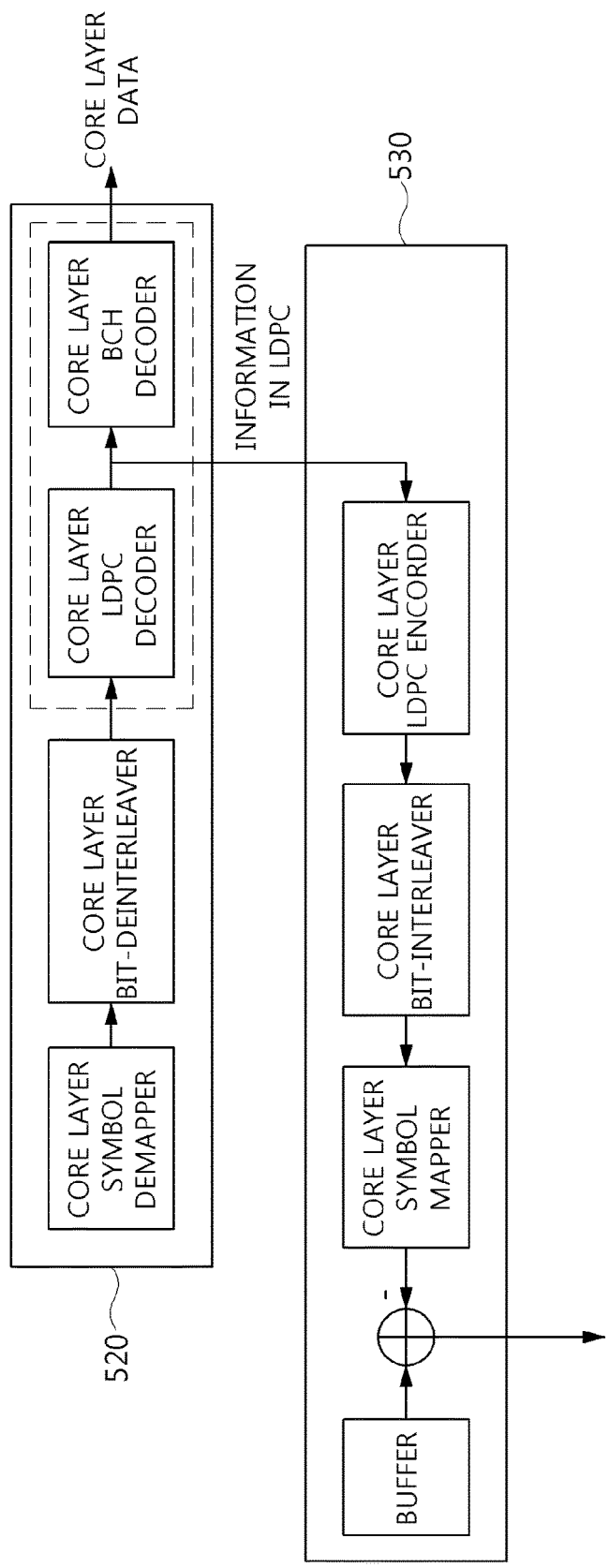
FIG. 8 is a block diagram showing another example of the core layer BICM decoder and the enhanced layer symbol extractor shown in FIG. 6.

FIG. 8 is a block diagram showing another example of the core layer BICM decoder 520 and the enhanced layer symbol extractor 530 shown in FIG. 6.

Referring to FIG. 8, the core layer BICM decoder 520 includes a core layer symbol demapper, a core layer bit deinterleaver, a core layer LDPC decoder, and a core layer BCH decoder.

That is, in the example shown in FIG. 8, the core layer error correction decoder includes the core layer LDPC decoder and the core layer BCH decoder.

Furthermore, in the example shown in FIG. 8, the core layer LDPC decoder provides information bits, excluding parity bits, to the enhanced layer symbol extractor 530.

In this case, although the enhanced layer symbol extractor 530 does not need to include a core layer BCH encoder, it must include a core layer LDPC encoder.

A residual error that may remain in the LDPC code parity part may be eliminated more desirably in the example shown in FIG. 8 than in the example shown in FIG. 7.

Figure 9:
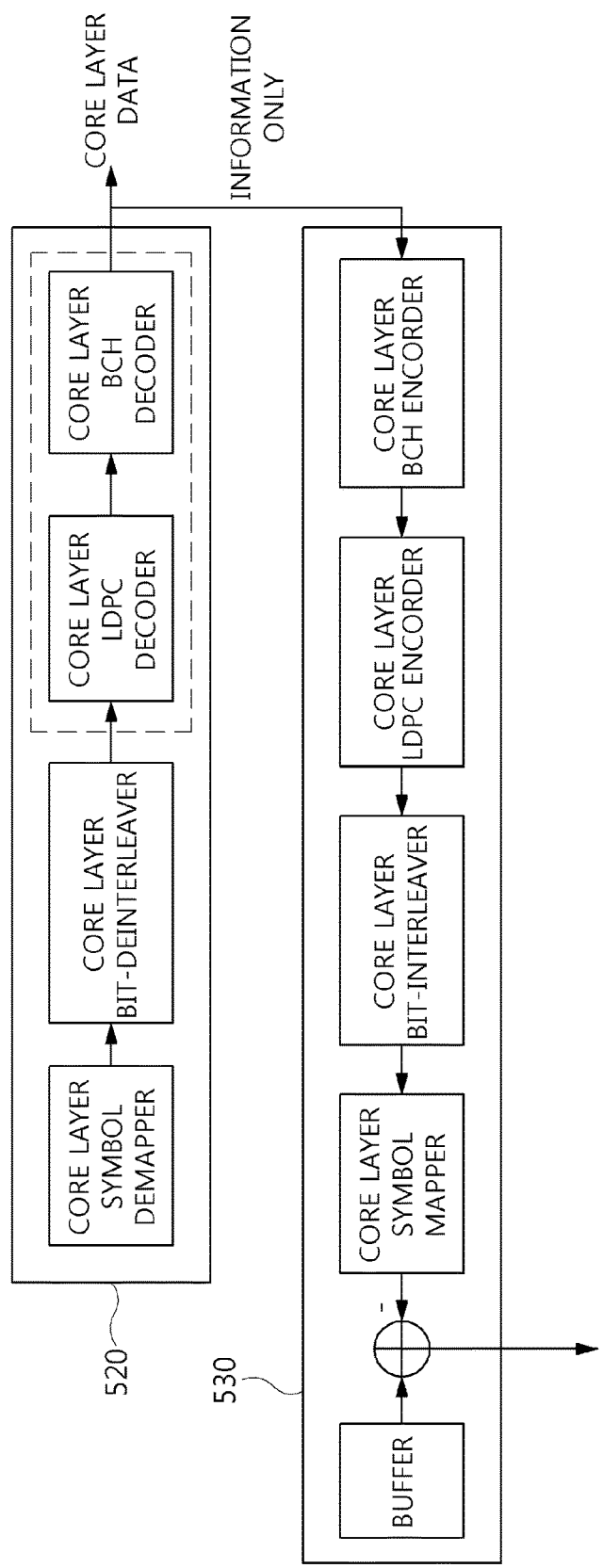
FIG. 9 is a block diagram showing still another example of the core layer BICM decoder and the enhanced layer symbol extractor shown in FIG. 6.

FIG. 9 is a block diagram showing still another example of the core layer BICM decoder 520 and the enhanced layer symbol extractor 530 shown in FIG. 6.

Referring to FIG. 9, the core layer BICM decoder 520 includes a core layer symbol demapper, a core layer bit deinterleaver, a core layer LDPC decoder, and a core layer BCH decoder.

That is, in the example shown in FIG. 9, the core layer error correction decoder includes the core layer LDPC decoder and the core layer BCH decoder.

In the example shown in FIG. 9, the output of the core layer BCH decoder corresponding to core layer data is provided to the enhanced layer symbol extractor 530.

Figure 10:
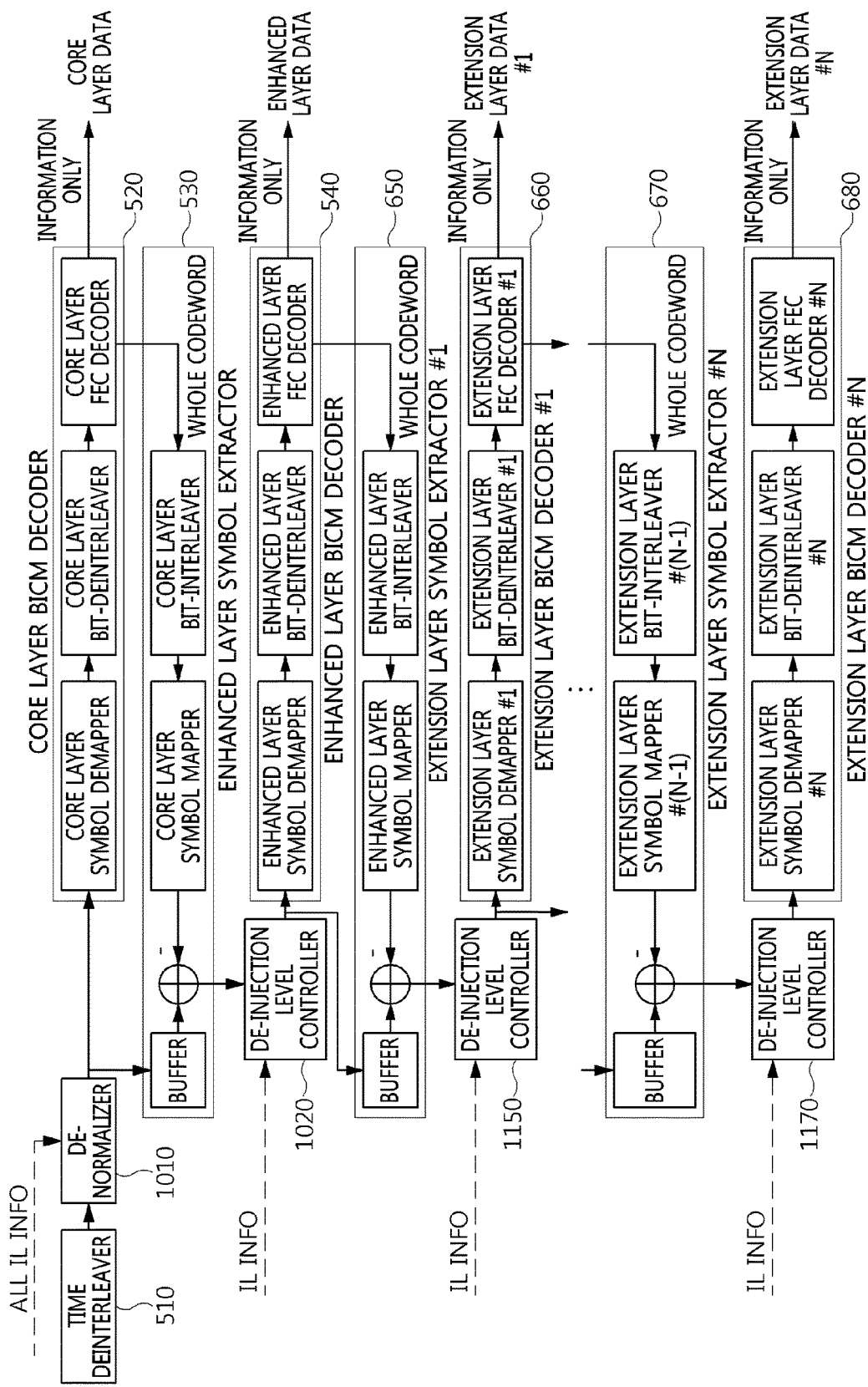
FIG. 10 is a block diagram showing another example of the signal demultiplexer shown in FIG. 1.

In this case, although the enhanced layer symbol extractor 530 has high complexity because it must include both a core layer LDPC encoder and a core layer BCH encoder, it guarantees higher performance than those in the examples of FIGS. 9 and 10.

FIG. 10 is a block diagram showing another example of the signal demultiplexer shown in FIG. 1.

Referring to FIG. 10, a signal demultiplexer according to an embodiment of the present invention includes a time deinterleaver 510, a de-normalizer 1010, a core layer BICM decoder 520, an enhanced layer symbol extractor 530, an enhanced layer BICM decoder 540, one or more extension layer symbol extractors 650 and 670, one or more extension layer BICM decoders 660 and 680, and de-injection level controllers 1020, 1150 and 1170.

In this case, the signal demultiplexer shown in FIG. 10 may correspond to the apparatus for generating broadcast signal frame shown in FIG. 5.

The time deinterleaver 510 receives a received signal from an OFDM receiver for performing operations, such as synchronization, channel estimation and equalization, and performs an operation related to the distribution of burst errors occurring over a channel. In this case, L1 signaling information may be decoded by the OFDM receiver first, and then may be used for data decoding. In particular, the injection level information of the L1 signaling information may be transferred to the de-normalizer 1010 and the de-injection level controllers 1020, 1150 and 1170.

In this case, the de-normalizer 1010 may obtain the injection level information of all layers, may obtain a de-normalizing factor using Equation 6 below, and may multiply the input signal with the de-normalizing factor:

$$\text{De-normalizing factor} = \qquad (6)$$

$$(\text{normalizing factor})^{-1} = \left( \sqrt{\begin{array}{l} \left(1 + 10^{-\text{Injection level \#1(dB)}/10} + \right.\\ 10^{-\text{Injection level \#2(dB)}/10} + \cdots + \\ \left. 10^{-\text{Injection level \#(N+1)(dB)}/10}\right) \end{array}} \right)$$

That is, the de-normalizing factor is the reciprocal of the normalizing factor expressed by Equation 4 above.

In an embodiment, when the N1 signaling includes not only injection level information but also normalizing factor information, the de-normalizer 1010 may simply obtain a de-normalizing factor by taking the reciprocal of a normalizing factor without the need to calculate the de-normalizing factor using an injection level.

The de-normalizer 1010 corresponds to the power normalizer of the transmitter, and increases power by a level by which the power normalizer has decreased the power.

Although the de-normalizer 1010 is illustrated as adjusting the power of the output signal of the time interleaver 510 in the example shown in FIG. 10, the de-normalizer 1010 may be located before the time interleaver 510 so that power adjustment can be performed before interleaving in an embodiment.

That is, the de-normalizer 1010 may be viewed as being located before or after the time interleaver 510 and amplifying the magnitude of a signal for the purpose of the LLR calculation of the core layer symbol demapper.

The output of the time deinterleaver 510 (or the output of the de-normalizer 1010) is provided to the core layer BICM decoder 520, and the core layer BICM decoder 520 restores core layer data.

In this case, the core layer BICM decoder 520 includes a core layer symbol demapper, a core layer bit deinterleaver, and a core layer error correction decoder. The core layer symbol demapper calculates LLR values related to symbols, the core layer bit deinterleaver strongly mixes the calculated LLR values with burst errors, and the core layer error correction decoder corrects error occurring over a channel.

In particular, the core layer error correction decoder may output only information bits, or may output all bits in which information bits have been combined with parity bits. In this case, the core layer error correction decoder may output only information bits as core layer data, and may output all bits in which information bits have been combined with parity bits to the enhanced layer symbol extractor 530.

The core layer error correction decoder may be formed by connecting a core layer LDPC decoder and a core layer BCH decoder in series. That is, the input of the core layer error correction decoder may be input to the core layer LDPC decoder, the output of the core layer LDPC decoder may be input to the core layer BCH decoder, and the output of the core layer BCH decoder may become the output of the core layer error correction decoder. In this case, the LDPC decoder performs LDPC decoding, and the BCH decoder performs BCH decoding.

The enhanced layer error correction decoder may be also formed by connecting an enhanced layer LDPC decoder and an enhanced layer BCH decoder in series. That is, the input of the enhanced layer error correction decoder may be input to the enhanced layer LDPC decoder, the output of the enhanced layer LDPC decoder may be input to the enhanced layer BCH decoder, and the output of the enhanced layer BCH decoder may become the output of the enhanced layer error correction decoder.

Moreover, the extension layer error correction decoder may be also formed by connecting an extension layer LDPC decoder and an extension layer BCH decoder in series. That is, the input of the extension layer error correction decoder may be input to the extension layer LDPC decoder, the output of the extension layer LDPC decoder may be input to the extension layer BCH decoder, and the output of the extension layer BCH decoder may become the output of the extension layer error correction decoder.

In particular, the tradeoff between the complexity of implementation, regarding which of the outputs of the error correction decoders will be used, which has been described with reference to FIGS. 9, 10 and 11, and performance is applied to not only the core layer BICM decoder 520 and enhanced layer symbol extractor 530 of FIG. 10 but also the extension layer symbol extractors 650 and 670 and the extension layer BICM decoders 660 and 680.

The enhanced layer symbol extractor 530 may receive the all bits from the core layer BICM decoder 520 of the core layer error correction decoder, and may extract enhanced layer symbols from the output signal of the time deinterleaver 510 or the denormalizer 1010. In an embodiment, the enhanced layer symbol extractor 530 may not receive all bits from the error correction decoder of the core layer BICM decoder 520, but may receive LDPC information bits or BCH information bits.

In this case, the enhanced layer symbol extractor 530 includes a buffer, a subtracter, a core layer symbol mapper, and a core layer bit interleaver. The buffer stores the output signal of the time deinterleaver 510 or de-normalizer 1010. The core layer bit interleaver receives the all bits (information bits+parity bits) of the core layer BICM decoder, and performs the same core layer bit interleaving as the transmitter. The core layer symbol mapper generates core layer symbols, which are the same as the transmitter, from the interleaved signal. The subtracter obtains enhanced layer symbols by subtracting the output signal of the core layer symbol mapper from the signal stored in the buffer, and transfers the enhanced layer symbols to the de-injection level controller 1020.

In this case, the core layer bit interleaver and core layer symbol mapper included in the enhanced layer symbol extractor 530 may be the same as the core layer bit interleaver and the core layer symbol mapper shown in FIG. 5.

The de-injection level controller 1020 receives the enhanced layer symbols, and increases the power of the input signal by a level by which the injection level controller of the transmitter has decreased the power. That is, the de-injection level controller 1020 amplifies the input signal, and provides the amplified input signal to the enhanced layer BICM decoder 540.

The enhanced layer BICM decoder 540 receives the enhanced layer symbol whose power has been increased by the de-injection level controller 1020, and restores the enhanced layer data.

In this case, the enhanced layer BICM decoder 540 may include an enhanced layer symbol demapper, an enhanced layer bit deinterleaver, and an enhanced layer error correction decoder. The enhanced layer symbol demapper calculates LLR values related to the enhanced layer symbols, the enhanced layer bit deinterleaver strongly mixes the calculated LLR values with burst errors, and the enhanced layer error correction decoder corrects error occurring over a channel.

In particular, the enhanced layer error correction decoder may output only information bits, and may output all bits in which information bits have been combined with parity bits. In this case, the enhanced layer error correction decoder may output only information bits as enhanced layer data, and may output all bits in which information bits have been mixed with parity bits to the extension layer symbol extractor 650.

The extension layer symbol extractor 650 receives all bits from the enhanced layer error correction decoder of the enhanced layer BICM decoder 540, and extracts extension layer symbols from the output signal of the de-injection level controller 1020.

In this case, the de-injection level controller 1020 may amplify the power of the output signal of the subtracter of the enhanced layer symbol extractor 530.

In this case, the extension layer symbol extractor 650 includes a buffer, a subtracter, an enhanced layer symbol mapper, and an enhanced layer bit interleaver. The buffer stores the output signal of the de-injection level controller 1020. The enhanced layer bit interleaver receives the all bits information (bits+parity bits) of the enhanced layer BICM decoder, and performs enhanced layer bit interleaving that is the same as that of the transmitter. The enhanced layer symbol mapper generates enhanced layer symbols, which are the same as those of the transmitter, from the interleaved signal. The subtracter obtains extension layer symbols by subtracting the output signal of the enhanced layer symbol mapper from the signal stored in the buffer, and transfers the extension layer symbols to the extension layer BICM decoder 660.

In this case, the enhanced layer bit interleaver and the enhanced layer symbol mapper included in the extension layer symbol extractor 650 may be the same as the enhanced layer bit interleaver and the enhanced layer symbol mapper shown in FIG. 5.

The de-injection level controller 1150 increases power by a level by which the injection level controller of a corresponding layer has decreased the power at the transmitter.

In this case, the de-injection level controller may be viewed as performing the operation of multiplying the extension layer gain of Equation 7 below. In this case, a 0-th injection level may be considered to be 0 dB:

$$n\text{-th extension layer gain} = \frac{10^{-Injection\ level\ \#(n-1)(dB)/10}}{10^{-Injection\ level\ \#n(dB)/10}} \quad (7)$$

The extension layer BICM decoder 660 receives the extension layer symbols whose power has been increased by the de-injection level controller 1150, and restores extension layer data.

In this case, the extension layer BICM decoder 660 may include an extension layer symbol demapper, an extension layer bit deinterleaver, and an extension layer error correction decoder. The extension layer symbol demapper calculates LLR values related to the extension layer symbols, the extension layer bit deinterleaver strongly mixes the calculated LLR values with burst errors, and the extension layer error correction decoder corrects error occurring over a channel.

In particular, each of the extension layer symbol extractor and the extension layer BICM decoder may include two or more extractors or decoders if two or more extension layers are present.

That is, in the example shown in FIG. 10, the extension layer error correction decoder of the extension layer BICM decoder 660 may output only information bits, and may output all bits in which information bits have been combined with parity bits. In this case, the extension layer error correction decoder outputs only information bits as extension layer data, and may output all bits in which information bits have been mixed with parity bits to the subsequent extension layer symbol extractor 670.

The configuration and operation of the extension layer symbol extractor 670, the extension layer BICM decoder 680 and the de-injection level controller 1170 can be easily understood from the configuration and operation of the above-described extension layer symbol extractor 650, extension layer BICM decoder 660 and de-injection level controller 1150.

A lower one of the de-injection level controllers 1020, 1150 and 1170 shown in FIG. 10 may correspond to a larger increase in power. That is, the de-injection level controller 1150 may increase power more than the de-injection level controller 1020, and the de-injection level controller 1170 may increase power more than the de-injection level controller 1150.

It can be seen that the signal demultiplexer shown in FIG. 10 restores core layer data first, restores enhanced layer data using the cancellation of core layer symbols, and restores extension layer data using the cancellation of enhanced layer symbols. Two or more extension layers may be provided, in which case restoration starts with an extension layer combined at a higher power level.

Figure 11:
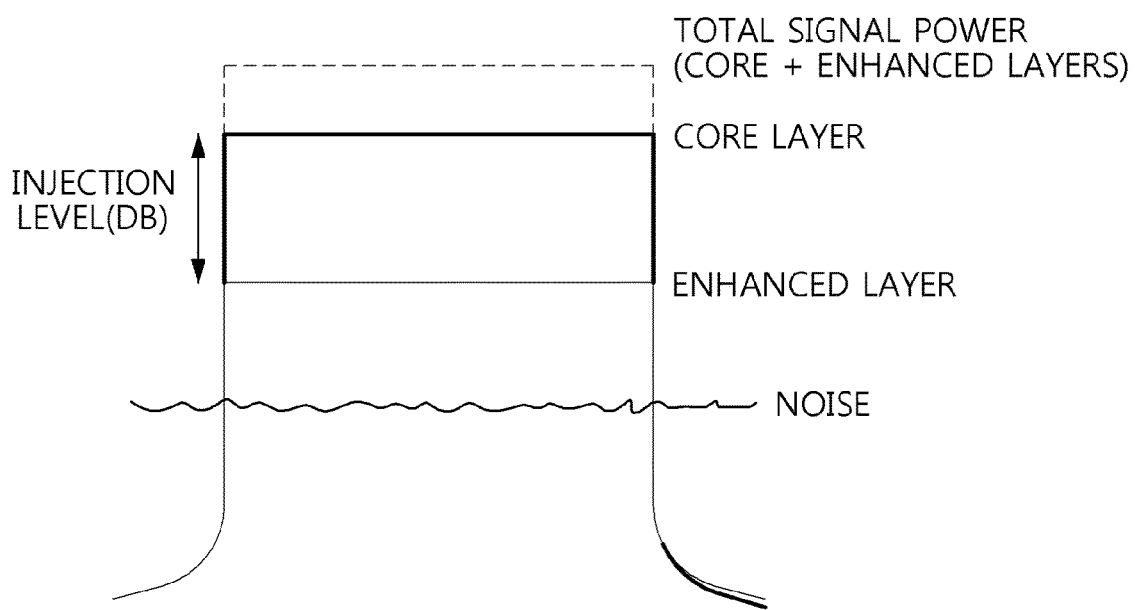
FIG. 11 is a diagram showing an increase in power attributable to the combination of a core layer signal and an enhanced layer signal.

FIG. 11 is a diagram showing in an increase in power attributable to the combination of a core layer signal and an enhanced layer signal.

Referring to FIG. 11, it can be seen that when a multiplexed signal is generated by combining a core layer signal with an enhanced layer signal whose power has been reduced by an injection level, the power level of the multiplexed signal is higher than the power level of the core layer signal or the enhanced layer signal.

In this case, the injection level that is adjusted by the injection level controllers shown in FIGS. 3 and 5 may be adjusted from 0 dB to 10.0 dB in steps of 0.5 dB or 1 dB. When the injection level is 3.0 dB, the power of the enhanced layer signal is lower than that of the core layer signal by 3 dB. When the injection level is 10.0 dB, the power of the enhanced layer signal is lower than that of the core layer signal by 10 dB. This relationship may be applied not only between a core layer signal and an enhanced layer signal but also between an enhanced layer signal and an extension layer signal or between extension layer signals.

The power normalizers shown in FIGS. 3 and 5 may adjust the power level after the combination, thereby solving problems, such as the distortion of the signal, that may be caused by an increase in power attributable to the combination.

Figure 12:
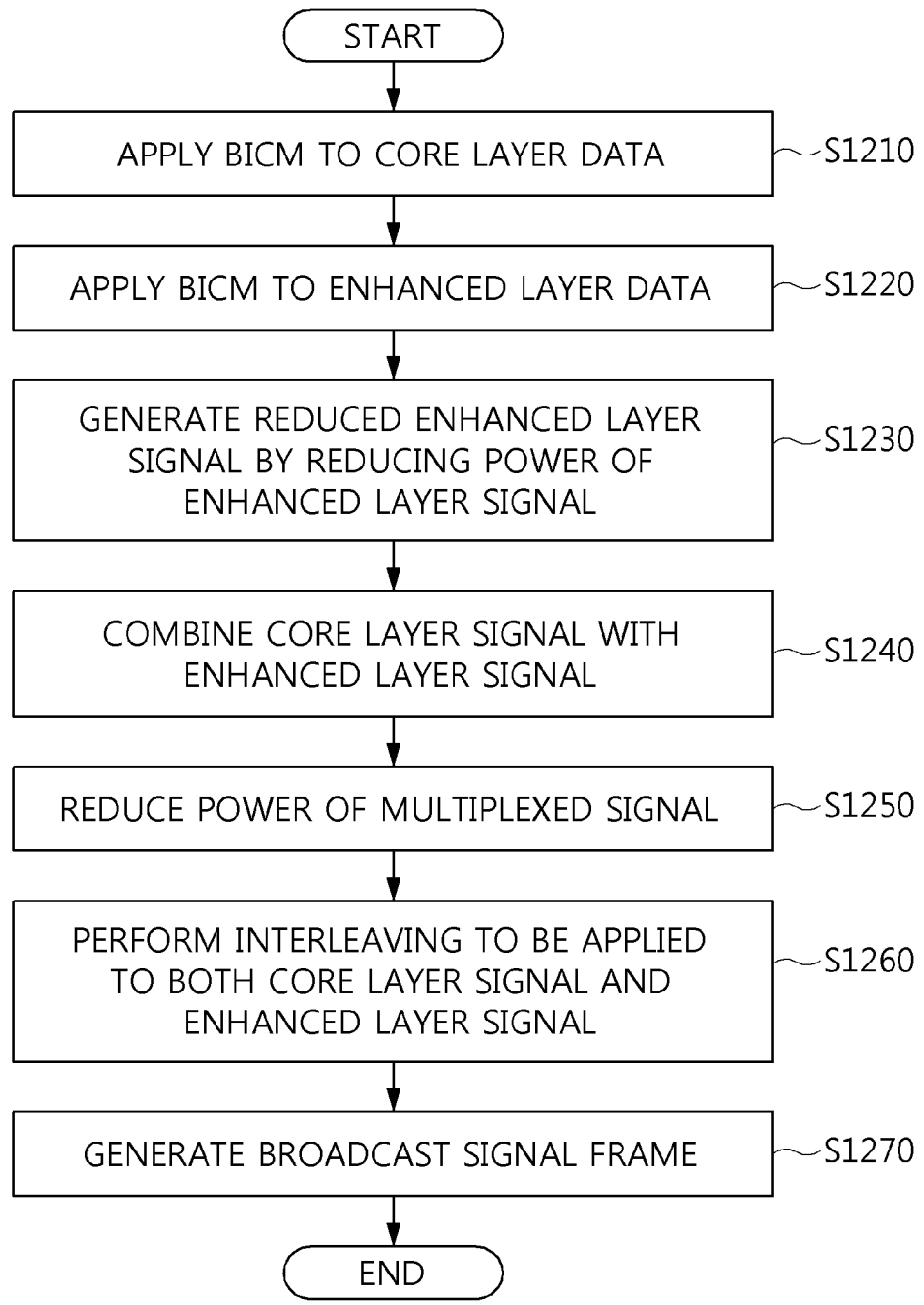
FIG. 12 is an operation flowchart showing a method of generating broadcast signal frame according to an embodiment of the present invention.

FIG. 12 is an operation flowchart showing a method of generating broadcast signal frame according to an embodiment of the present invention.

Referring to FIG. 12, in the method according to the embodiment of the present invention, BICM is applied to core layer data at step S1210.

Furthermore, in the method according to the embodiment of the present invention, BICM is applied to enhanced layer data at step S1220.

The BICM applied at step S1220 may be different from the BICM applied to step S1210. In this case, the BICM applied at step S1220 may be less robust than the BICM applied to step S1210. In this case, the bit rate of the BICM applied at step S1220 may be less robust than that of the BICM applied to step S1210.

In this case, an enhanced layer signal may correspond to the enhanced layer data that is restored based on cancellation corresponding to the restoration of the core layer data corresponding to a core layer signal.

Furthermore, in the method according to the embodiment of the present invention, a power-reduced enhanced layer signal is generated by reducing the power of the enhanced layer signal at step S1230.

In this case, at step S1230, an injection level may be changed from 0 dB to 10.0 dB in steps of 0.5 dB or 1 dB.

Furthermore, in the method according to the embodiment of the present invention, a multiplexed signal is generated by combining the core layer signal and the power-reduced enhanced layer signal at step S1240.

That is, at step S1240, the core layer signal and the enhanced layer signal are combined at different power levels so that the power level of the enhanced layer signal is lower than the power level of the core layer signal.

In this case, at step S1240, one or more extension layer signals having lower power levels than the core layer signal and the enhanced layer signal may be combined with the core layer signal and the enhanced layer signal.

Furthermore, in the method according to the embodiment of the present invention, the power of the multiplexed signal is reduced at step S1250.

In this case, at step S1250, the power of the multiplexed signal may be reduced to the power of the core layer signal. In this case, at step S1250, the power of the multiplexed signal may be reduced by a level by which the power has been increased at step S1240.

Furthermore, in the method according to the embodiment of the present invention, a time-interleaved signal is generated by performing time interleaving that is applied to both the core layer signal and the enhanced layer signal is performed at step S1260.

According to an embodiment, the time-interleaved signal may be generated by performing interleaving on the BICM output signal in case of a single layer at step S1260.

Furthermore, in the method according to the embodiment of the present invention, a broadcast signal frame including a bootstrap and a preamble is generated using the time-interleaved signal at step S1270. In this case, the bootstrap may include a symbol for signaling a BICM mode and OFDM parameters of L1-Basic of the preamble, together.

In this case, the step S1270 may include generating the bootstrap; generating the preamble; and generating a data payload corresponding to the time-interleaved signal. In this case, the data payload may be a super-imposed payload.

In this case, the symbol may correspond to a fixed-length bit string signaling a BICM mode of the L1-Basic along with OFDM parameters of the L1-Basic.

In this case, the fixed-length bit string may be a bit string capable of identifying 256 combinations.

In this case, the OFDM parameters may correspond to a combination of a FFT size, a guard interval length and a pilot pattern.

In this case, the BICM mode may include a first mode, a second mode and a third mode for identifying QPSK and a code rate of 3/15, a fourth mode for identifying 16-NUC (Non Uniform Constellation) and a code rate of 3/15, and a fifth mode for identifying 64-NUC (Non Uniform Constellation) and a code rate of 3/15.

In this case, the OFDM parameters may support all combinations of FFT sizes and guard interval lengths corresponding to data symbols for each of the first mode, the second mode, the third mode, the fourth mode and the fifth mode, and may correspond to 32 selected pilot patterns which are generated by selecting one or two among pilot patterns corresponding to each of the all combinations.

In this case, the first mode may correspond to a mode in which the parity repetition is performed, and the second and third modes may correspond to a mode in which the parity repetition is not performed.

In this case, the parity puncturing size of the second mode may be larger than the parity puncturing size of the first mode and be smaller than the parity puncturing size of the third mode.

In this case, the symbol may correspond to a lookup table in which a preamble structure corresponding to a second guard interval length is allocated prior to a preamble structure corresponding to a first guard interval length, the second guard interval length being shorter than the first guard interval length when the FFT sizes corresponding to the OFDM parameters are the same.

In this case, the symbol may correspond to a lookup table in which the first mode, the second mode, the third mode, the fourth mode and the fifth mode are allocated in an order of robustness for the same combination of a FFT size, a guard interval length and a pilot pattern.

In this case, the bootstrap may be shorter than the preamble, and have a fixed length.

In this case, the preamble may include L1-Basic and L1-Detail, and the bootstrap may include a symbol representing a structure of L1-Basic.

Although not explicitly shown in FIG. 12, the method may further include the step of generating signaling information including injection level information corresponding to step S1230. In this case, the signaling information may be L1 signaling information.

The method of generating broadcast signal frame shown in FIG. 12 may correspond to step S210 shown in FIG. 2.

Figure 13:
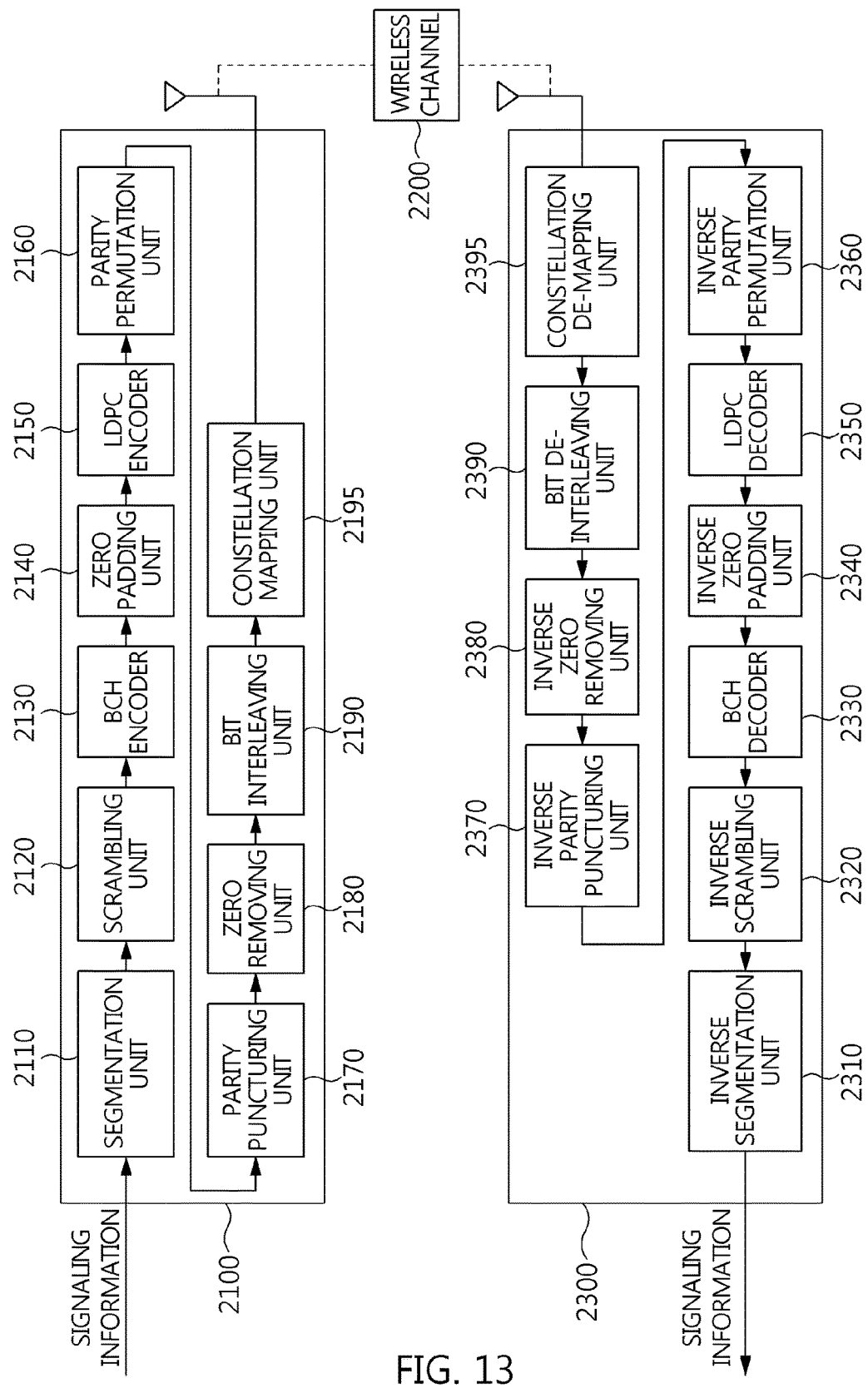
FIG. 13 is a block diagram showing a signaling information encoding/decoding system according to an embodiment of the present invention.

FIG. 13 is a block diagram showing a signaling information encoding/decoding system according to an embodiment of the present invention.

Referring to FIG. 13, the signaling information encoding/decoding system includes a signaling information encoding apparatus 2100, and a signaling information decoding apparatus 2300.

The signaling information encoding apparatus 2100 and the signaling information decoding apparatus 2300 perform communication through the medium of a wireless channel 2200.

The signaling information encoding apparatus 2100 channel-encodes and modulates signaling information, such as L1-Basic, L1-Detail or the like.

The signaling information encoding apparatus 2100 includes a segmentation unit 2110, a scrambling unit 2120, a BCH encoder 2130, a zero padding unit 2140, an LDPC encoder 2150, a parity permutation unit 2160, a parity puncturing unit 2170, a zero removing unit 2180, a bit interleaving unit 2190, and a constellation mapping unit 2195.

The signaling information encoding apparatus 2100 shown in FIG. 13 may be viewed as corresponding to a Bit-Interleaved Coded Modulation (BICM) apparatus. In this case, the error correction encoder of the BICM apparatus may be viewed as corresponding to the segmentation unit 2110, the scrambling unit 2120, the BCH encoder 2130, the zero padding unit 2140, the LDPC encoder 2150, the parity permutation unit 2160, the parity puncturing unit 2170, and the zero removing unit 2180 that are shown in FIG. 13.

When the length of the signaling information is longer than a preset length, the segmentation unit 2110 segments the signaling information into a plurality of groups in order to segment the signaling information into a plurality of LDPC codewords and then transmit the LDPC codewords. That is, when the signaling information cannot be contained in a single LDPC codeword, the segmentation unit may determine the number of codewords in which the signaling information is to be contained, and then may segment the signaling information according to the determined number of codewords.

For example, when the length of the signaling information is fixed like L1-Basic, the signaling information encoding apparatus 2100 may not include the segmentation unit 2110.

For example, when the length of the signaling information is variable like L1-Detail, the signaling information encoding apparatus 2100 may include the segmentation unit 2110.

The scrambling unit 2120 performs scrambling in order to protect the signaling information. In this case, the scrambling may be performed using various methods that are known in the present technical field.

The BCH encoder 2130 performs BCH encoding using a BCH parity whose parity length $N_{bch\_Parity}$ is 168 bits.

In this case, the BCH encoding may be the same as BCH encoding for LDPC code in which the length of data BICM is 16200.

In this case, a BCH polynomial used for the BCH encoding may be expressed in Table 5 below, and the BCH encoding expressed in Table 5 may have 12-bit error correction capability:

TABLE 5

| | Code Length $N_{ldpc}$ = 16200 |
|---|---|
| $g_1(x)$ | $1 + x + x^3 + x^5 + x^{14}$ |
| $g_2(x)$ | $1 + x^6 + x^8 + x^{11} + x^{14}$ |
| $g_3(x)$ | $1 + x + x^2 + x^6 + x^9 + x^{10} + x^{14}$ |
| $g_4(x)$ | $1 + x^4 + x^7 + x^8 + x^{10} + x^{12} + x^{14}$ |
| $g_5(x)$ | $1 + x^2 + x^4 + x^6 + x^8 + x^9 + x^{11} + x^{13} + x^{14}$ |
| $g_6(x)$ | $1 + x^3 + x^7 + x^8 + x^9 + x^{13} + x^{14}$ |
| $g_7(x)$ | $1 + x^2 + x^5 + x^6 + x^7 + x^{10} + x^{11} + x^{13} + x^{14}$ |
| $g_8(x)$ | $1 + x^5 + x^8 + x^9 + x^{10} + x^{11} + x^{14}$ |
| $g_9(x)$ | $1 + x + x^2 + x^3 + x^9 + x^{10} + x^{14}$ |
| $g_{10}(x)$ | $1 + x^3 + x^6 + x^9 + x^{11} + x^{12} + x^{14}$ |
| $g_{11}(x)$ | $1 + x^4 + x^{11} + x^{12} + x^{14}$ |
| $g_{12}(x)$ | $1 + x + x^2 + x^3 + x^5 + x^6 + x^7 + x^8 + x^{10} + x^{13} + x^{14}$ |

After the BCH encoding has been performed, the zero padding unit 2140 performs zero padding or shortening.

In this case, the zero padding means that part of a bit string is filled with bit "0."

As a result of the BCH encoding, the length of the bit string may be expressed by $N_{bch}=K_{sig}+N_{bch\_Parity}$. In this case, $K_{sig}$ may be the number of information bits of the BCH encoding. For example, when $K_{sig}$ is fixed to 200 bits, $N_{bch}$ may be 368 bits.

When the LDPC encoder 2150 uses an LDPC code whose code rate is 3/15 and whose length is 16200, the information length $K_{ldpc}$ of the LDPC code is 3240 bits. In this case, since information that is to be actually transmitted is $N_{bch}$ bits and the length of the information part of the LDPC code is $K_{ldpc}$ bits, zero padding, i.e., the process of filling bits corresponding to $K_{ldpc}-N_{bch}$ with bit "0," is performed. $K_{ldpc}-N_{bch}$ may be 2872 in case of L1-Basic information.

In this case, the order of the zero padding plays an important role in determining the performance of the encoder, and the order of the zero padding may be expressed as shortening pattern order.

In this case, the bits padded with zeros are used only for LDPC encoding, and are not actually transmitted.

The LDPC information bits composed of $K_{ldpc}$ bits is segmented into $N_{info\_group}$ groups, as shown in Equation 8 below. For example, when $K_{ldpc}$ is 3240, $N_{info\_group}$ is 9, and thus the LDPC information bits may be grouped into 9 groups.

$$Z_j = \{i_k | 360 \times j \leq k < 360 \times (j+1)\} \text{ for } 0 \leq j < N_{info\_group} \quad (8)$$

where $Z_j$ is a group composed of 360 bits.

The part of $K_{ldpc}$ bits that is zero-padded is determined according to the following procedure.

(Step 1) First, the number of groups in which all the bits thereof will be padded with "0" is calculated using Equation 9 below:

$$N_{pad} = \left\lfloor \frac{K_{ldpc} - N_{bch}}{360} \right\rfloor \quad (9)$$

For example, when $K_{ldpc}$ is 3240 and $N_{bch}$ is 368, $N_{pad}$ may be 7. The fact that $N_{pad}$ is 7 indicates that the number of groups in which all the bits thereof will be padded with "0" is 7.

(Step 2) When $N_{pad}$ is not 0, zero padding is performed on $N_{pad}$ groups in the order of $Z_{\pi_s(0)}, Z_{\pi_s(1)}, \ldots, Z_{\pi_s(N_{pad}-1)}$ according to the shortening pattern order $\pi_s(j)$ of Table 6 below. In this case, $\pi_s(j)$ may refer to the shortening pattern order of a j-th bit group.

When $N_{pad}$ is 0, the above procedure is omitted.

TABLE 6

| | | $\pi_s(j)$ (0 ≤ j < $N_{group}$) | | | | | | | | |
|---|---|---|---|---|---|---|---|---|---|---|
| MODE | $N_{group}$ | $\pi_s(0)$ | $\pi_s(1)$ | $\pi_s(2)$ | $\pi_s(3)$ | $\pi_s(4)$ | $\pi_s(5)$ | $\pi_s(6)$ | $\pi_s(7)$ | $\pi_s(8)$ |
| L1-Basic | 9 | 4 | 1 | 5 | 2 | 8 | 6 | 0 | 7 | 3 |

The shortening pattern order of Table 6 above indicates that zero padding targets are selected in the order of an 5th group indexed as 4, a 2th group indexed as 1, a 6th group indexed as 5, a 3rd group indexed as 2, a 9th group indexed as 8, a 7th group indexed as 6, a 1st group indexed as 0, a 8th group indexed as 7, and a fourth group indexed as 3. That is, when only 7 groups are selected as zero padding targets in the example of Table 6 above, a total of 7 groups, i.e., the 5th group indexed as 4, the 2nd group indexed as 1, the 6th group indexed as 5, the 3rd group indexed as 2, the 9th group indexed as 8, the 7th group indexed as 6, and the 1st group indexed as 0, are selected as the zero padding targets.

In particular, the shortening pattern order of Table 6 above may be optimized for fixed length signaling information.

When the number of groups in which all the bits thereof will be padded with "0" and the corresponding groups are determined, all the bits of the determined groups are filled with "0."

(Step 3) Additionally, for a group corresponding to $Z_{\pi_s(N_{pad})}$, bits corresponding to $(K_{ldpc}-N_{bch}-360 \times N_{pad})$ from the start of the group are additionally zero-padded. In this case, the fact that zero padding is performed from the start of the corresponding group may indicate that zero padding is performed from a bit corresponding to a smaller index.

(Step 4) After the zero padding has been all completed, an LDPC information bit string is generated by sequentially mapping BCH-encoded $N_{bch}$ bits to a remaining part that has not been zero-padded.

The LDPC encoder 2150 performs LDPC encoding using $K_{ldpc}$ and which has been zero-padded and to which signaling information has been mapped.

In this case, the LDPC encoder 2150 may correspond to an LDPC codeword whose code rate is 3/15 and whose length is 16200. The LDPC codeword is a systematic code, and the LDPC encoder 2150 generates an output vector, such as that of Equation 10 below:

$$\Lambda=(c_0,c_1,\ldots,c_{N_{ldpc}-1})=(i_0,i_1,\ldots,i_{K_{ldpc}-1},p_0,p_1,\ldots,p_{16200-K_{ldpc}-1}) \quad (10)$$

For example, when $K_{ldpc}$ is 3240, parity bits may be 12960 bits.

The parity permutation unit 2160 performs group-wise parity interleaving on a parity part, not an information part, as a preliminary task for parity puncturing.

In this case, the parity permutation unit 2160 may perform parity interleaving using Equation 11 below:

$$Y_j=X_j, \quad 0 \leq j < K_{ldpc}/360$$

$$Y_j=X_{\pi(j)}, \quad K_{ldpc}/360 \leq j < 45 \quad (11)$$

where $Y_j$ is a j-th group-wise interleaved bit group, and $\pi(j)$ is the order of group-wise interleaving, which may be defined in Table 7 below:

TABLE 7

| | | Order of Group-wise interleaving $\pi(j)$ (9 ≤ j < 45) | | | | | | | | | | |
|---|---|---|---|---|---|---|---|---|---|---|---|---|
| Mode | $N_{group}$ | 9 | 10 | 11 | 12 | 13 | 14 | 15 | 16 | 17 | 18 | 19 | 20 |
| | | 21 | 22 | 23 | 24 | 25 | 26 | 27 | 28 | 29 | 30 | 31 | 32 |
| | | 33 | 34 | 35 | 36 | 37 | 38 | 39 | 40 | 41 | 42 | 43 | 44 |
| L1-Basic | 45 | 20 | 23 | 25 | 32 | 38 | 41 | 18 | 9 | 10 | 11 | 31 | 24 |
| | 14 | 15 | 26 | 40 | 33 | 19 | 28 | 34 | 16 | 39 | 27 | 30 | |
| | 21 | 44 | 43 | 35 | 42 | 36 | 12 | 13 | 29 | 22 | 37 | 17 | |

That is, the parity permutation unit 2160 outputs 3240 bits (9 bit groups) corresponding to information bits among the 16200 bits (45 bit groups) of the LDPC codeword without change, groups 12960 parity bits into 36 bit groups each including 360 bits, and interleave the 36 bit groups in the order of group-wise interleaving corresponding to Table 7 above.

The order of group-wise interleaving of Table 7 indicates that a 21th group indexed as 20 is located at a 10th group location indexed as 9, a 24rd group indexed as 23 is located at a 11st group location indexed as 10, a 26th group indexed as 25 is located at a 12nd group location indexed as 11, ..., and a 18th bit group indexed as 17 is located at a 45th group location indexed as 44.

In this case, the bit group (the bit group indexed as 20) at a front location may correspond to most important parity bits, and the bit group (the bit group indexed as 17) at a rear location may correspond to least important parity bits.

In particular, the order of group-wise interleaving of Table 7 may be optimized for fixed length signaling information.

After the parity interleaving (parity permutation) has been completed, the parity puncturing unit 2170 may puncture the partial parities of the LDPC codeword. The punctured bits are not transmitted. In this case, after the parity interleaving has been completed, parity repetition in which part of the parity-interleaved LDPC parity bits is repeated may be performed before parity puncturing is performed.

The parity puncturing unit 2170 calculates a final puncturing size, and punctures bits corresponding to the calculated final puncturing size. The final puncturing size corresponding to the number of bits to be punctured may be calculated according to the length $N_{bch}$ of the BCH-encoded bit string as follows:

(Step 1) A temporary puncturing size $N_{punc\_temp}$ is calculated using Equation 12 below:

$$N_{punc\_temp} = \left\lfloor \frac{A}{2^n} \times (K_{ldpc} - N_{bch}) \right\rfloor + B \quad (12)$$

where $K_{ldpc}$ is the length of the LDPC information bit string, $N_{bch}$ is the length of the BCH-encoded bit string, A is a first integer, and B is a second integer.

In this case, the difference $K_{ldpc}-N_{bch}$ between the length of the LDPC information bit string and the length of the BCH-encoded bit string may correspond to a zero padding length or a shortening length.

The parameters for puncturing required for the calculation of Equation 12 may be defined as in Table 8 below:

TABLE 8

| | $N_{bch}$ | $K_{ldpc}$ | A | B | n | $N_{ldpc\_parity}$ | $\eta_{MOD}$ |
|---|---|---|---|---|---|---|---|
| L1-Basic Mode 1 | 368 | 3240 | 0 | 9360 | 0 | 12960 | 2 |
| L1-Basic Mode 2 | 368 | 3240 | 0 | 11460 | 0 | 12960 | 2 |
| L1-Basic Mode 3 | 368 | 3240 | 0 | 12360 | 0 | 12960 | 2 | where $N_{ldpc\_parity}$ is the number of parity bits of the LDPC codeword, and $\eta_{MOD}$ is a modulation order. In this case, the modulation order may be 2, which is indicative of QPSK.

In particular, the parameters for puncturing of Table 8 may be optimized for fixed length signaling information.

(Step 2) The temporary number of transmission bits $N_{FFC\_temp}$ is calculated using the calculated temporary puncturing size $N_{punc\_temp}$ and $N_{ldpc\_parity}$ of Table 8, as shown in Equation 13 below:

$$N_{FFC\_temp} = N_{bch} + N_{ldpc\_parity} - N_{punc\_temp} \quad (13)$$

(Step 3) The number of transmission bits $N_{FFC}$ is calculated using the temporary number of transmission bits $N_{FFC\_temp}$, as shown in Equation 14 below:

$$N_{FFC} = \left\lceil \frac{N_{FFC\_temp}}{\eta_{MOD}} \right\rceil \times \eta_{MOD} \quad (14)$$

The number of transmission bits $N_{FFC}$ is the sum of the length of the information part and the length of the parity part after the completion of the puncturing.

(Step 4) A final puncturing size $N_{punc}$ is calculated using the calculated number of transmission bits $N_{FFC}$ as shown in Equation 15 below:

$$N_{punc} = N_{punc\_temp} - (N_{FEC} - N_{FEC\_temp}) \quad (15)$$

where the final puncturing size $N_{punc}$ is the size of parities that need to be punctured.

That is, the parity puncturing unit 2170 may puncture the last $N_{punc}$ bits of the whole LDPC codeword on which the parity permutation and the repetition have been performed.

The zero removing unit 2180 removes zero-padded bits from the information part of the LDPC codeword.

The bit interleaving unit 2190 performs bit interleaving on the zero-removed LDPC codeword. In this case, the bit interleaving may be performed using a method in which the direction in which the LDPC codeword is recorded in memory of a preset size and the direction in which the LDPC codeword is read therefrom are made different.

The constellation mapping unit 2195 performs symbol mapping. For example, the constellation mapping unit 2195 may be implemented using a QPSK method.

The signaling information decoding apparatus 2300 demodulates and channel-decodes signaling information, such as L1-Basic, L1-Detail, or the like.

The signaling information decoding apparatus 2300 includes a constellation de-mapping unit 2395, a bit de-interleaving unit 2390, an inverse zero removing unit 2380, an inverse parity puncturing unit 2370, an inverse parity permutation unit 360, an LDPC decoder 360, an inverse zero padding unit 2340, a BCH decoder 2330, an inverse scrambling unit 2320, and an inverse segmentation unit 2310.

The signaling information decoding apparatus 2300 shown in FIG. 13 may be viewed as corresponding to a Bit-Interleaved Coded Modulation (BICM) decoding apparatus. In this case, the error correction decoder of the BICM decoding apparatus may be viewed as corresponding to the inverse zero removing unit 2380, the inverse parity puncturing unit 2370, the inverse parity permutation unit 2360, the LDPC decoder 2350, the inverse zero padding unit 2340, the BCH decoder 2330, the inverse scrambling unit 2320 and the inverse segmentation unit 2310 that are shown in FIG. 13.

The inverse segmentation unit 2310 performs the inverse operation of the segmentation unit 2110.

The inverse scrambling unit 2320 performs the inverse operation of the scrambling unit 2120.

The BCH decoder 2330 performs the inverse operation of the BCH encoder 2130.

The inverse zero padding unit 2340 performs the inverse operation of the zero padding unit 2140.

In particular, the inverse zero padding unit 2340 may receive an LDPC information bit string from the LDPC decoder 2350, may select groups whose all bits are filled with 0 using shortening pattern order, and may generate a BCH-encoded bit string from the LDPC information bit string using groups exclusive of the former groups.

The LDPC decoder 2350 performs the inverse operation of the LDPC encoder 2150.

The inverse parity permutation unit 2360 performs the inverse operation of the parity permutation unit 2160.

In particular, the inverse parity permutation unit 2360 may segment the parity bits of the LDPC codeword into a plurality of groups, and may group-wise de-interleave the groups using the order of group-wise interleaving, thereby generating an LDPC codeword that is to be LDPC-decoded.

The inverse parity puncturing unit 370 performs the inverse operation of the parity puncturing unit 2170.

In this case, the inverse parity puncturing unit 370 may calculate a temporary puncturing size using a first integer, multiplied by the difference between the length of the LDPC information bit string and the length of the BCH-encoded bit string, and a second integer different from the first integer, may calculate the temporary number of transmission bits using the difference between the sum of the length of the BCH-encoded bit string and 12960 and the temporary puncturing size, may calculate the number of transmission bits using the temporary number of transmission bits and modulation order, may calculate a final puncturing size using the temporary number of transmission bits, the number of transmission bits and the temporary number of transmission bits, and may generate an LDPC codeword to be provided to the inverse parity permutation unit 2360 by taking into account the final puncturing size.

The inverse zero removing unit 2380 performs the inverse operation of the zero removing unit 2180.

The bit de-interleaving unit 2390 performs the inverse operation of the bit interleaving unit 2190.

The constellation de-mapping unit 2395 performs the inverse operation of the constellation mapping unit 2195.

Figure 14:
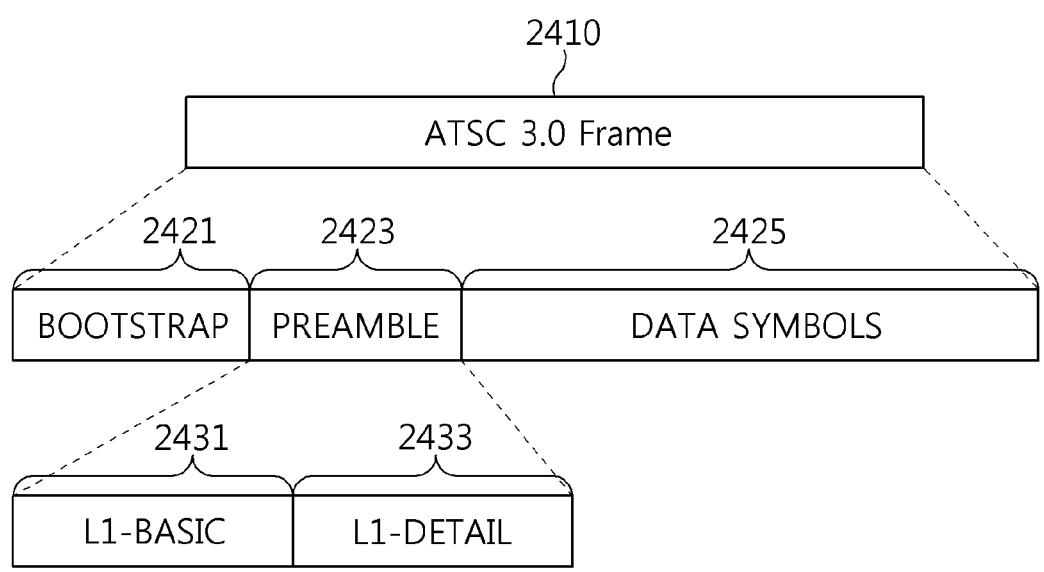
FIG. 14 is a diagram showing a broadcast signal frame according to an embodiment of the present invention.

FIG. 14 is a diagram showing a broadcast signal frame according to an embodiment of the present invention.

Referring to FIG. 14, the broadcast signal frame 2410 according to the embodiment of the present invention may include a bootstrap 2421, a preamble 2423, and data symbols 2425.

The preamble 2423 includes signaling information.

In an example shown in FIG. 14, the preamble 2423 may include L1-Basic information 2431 and L1-Detail information 2433.

In this case, the L1-Basic information 2431 may be fixed-length signaling information.

For example, the L1-Basic information 2431 may correspond to 200 bits.

In this case, the L1-Detail information 2433 may be variable length signaling information.

For example, the L1-Detail information 2433 may correspond to 200 to 2352 bits.

The broadcast signal frame 2410 may start with the bootstrap 2421 including version information of the system and the most general signaling information, followed by L1-Basic 2431 and L1-Detail 2433. L1-Basic 2431 may transmit general signaling information such as the modulation/code rate information for L1-Detail 2433, the number of PLPs, FFT size and Guard Interval with a constant number of bits, and L1-Detail 2433 may transmits remaining detail signaling information. In this case, the number of bits for L1-Detail 2433 may be varied according to the number of PLPs to be transmitted.

In this case, the bootstrap 2421 may signal the BICM mode and the OFDM parameters of the L1-Basic 2431, and L1 Basic 2431 may signal the BICM mode and the OFDM parameters of the L1-Detail 2433.

In this case, the BICM mode may include constellation and a code rate, and the OFDM parameters may include the FFT size, guard interval length and pilot pattern.

Figure 15:
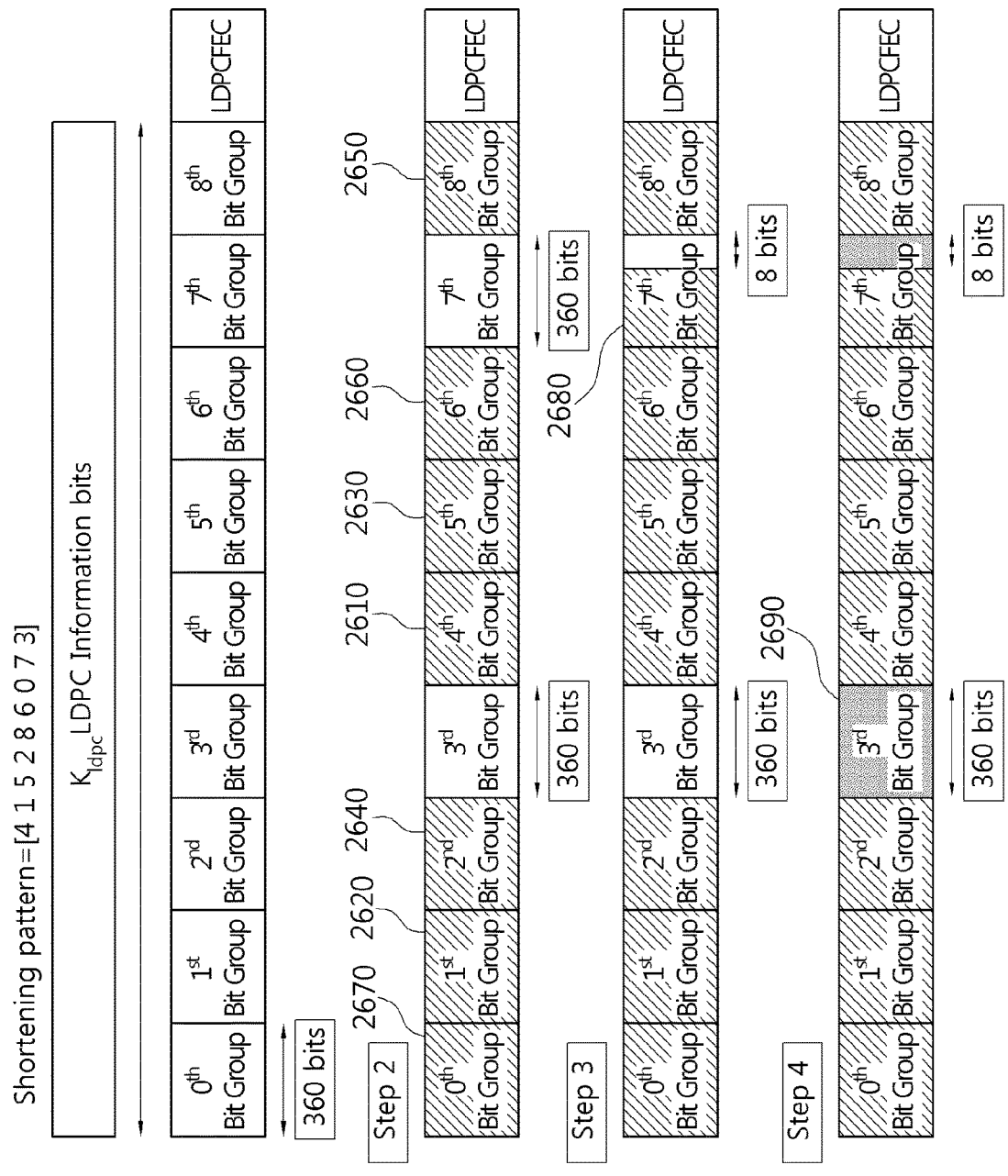
FIG. 15 is a diagram showing an example of the operation of the zero padding unit shown in FIG. 13.

FIG. 15 is a diagram showing an example of the operation of the zero padding unit shown in FIG. 13.

Referring to FIG. 15, a zero padding operation in the case where the shortening pattern order is [4 1 5 2 8 6 0 7 3] can be seen.

In the example shown in FIG. 15, the length of the LDPC information bit string is 3240, and thus LDPC information bits include 9 groups each composed of 360 bits.

First, when the number of groups for which all the bits thereof are filled with 0 is determined using Equation 9, (3240−368/360)=7.9, and thus 7 groups are determined to be the groups for which all the bits thereof are filled with 0.

Furthermore, since the shortening pattern order is [4 1 5 2 8 6 0 7 3], a total of 7 groups, i.e., a 5th group 2610 indexed as 4, a 2nd group 2620 indexed as 1, a 6th group 2630 indexed as 5, a 3rd group 2640 indexed as 2, a 9th group 2650 indexed as 8, a 7th group 2660 indexed as 6 and a 1st group 2670 indexed as 0, are selected, and all the bits of the groups are filled with 0.

Furthermore, since an 8th group 2680 indexed as 7 is next to the 1st group 2670 indexed as 0, 352 (=3240−368−(360× 7)) bits from the beginning of the 8th group 2680 indexed as 7 are filled with 0.

After the zero padding has been completed, the BCH-encoded bit string of $N_{bch}$ (=368) bits is sequentially mapped to a total of 368 bits, i.e., the 360 bits of the 4th group 2690 indexed as 3 and the remaining 8 bits of the 8th group 2680 indexed as 7.

Figure 16:
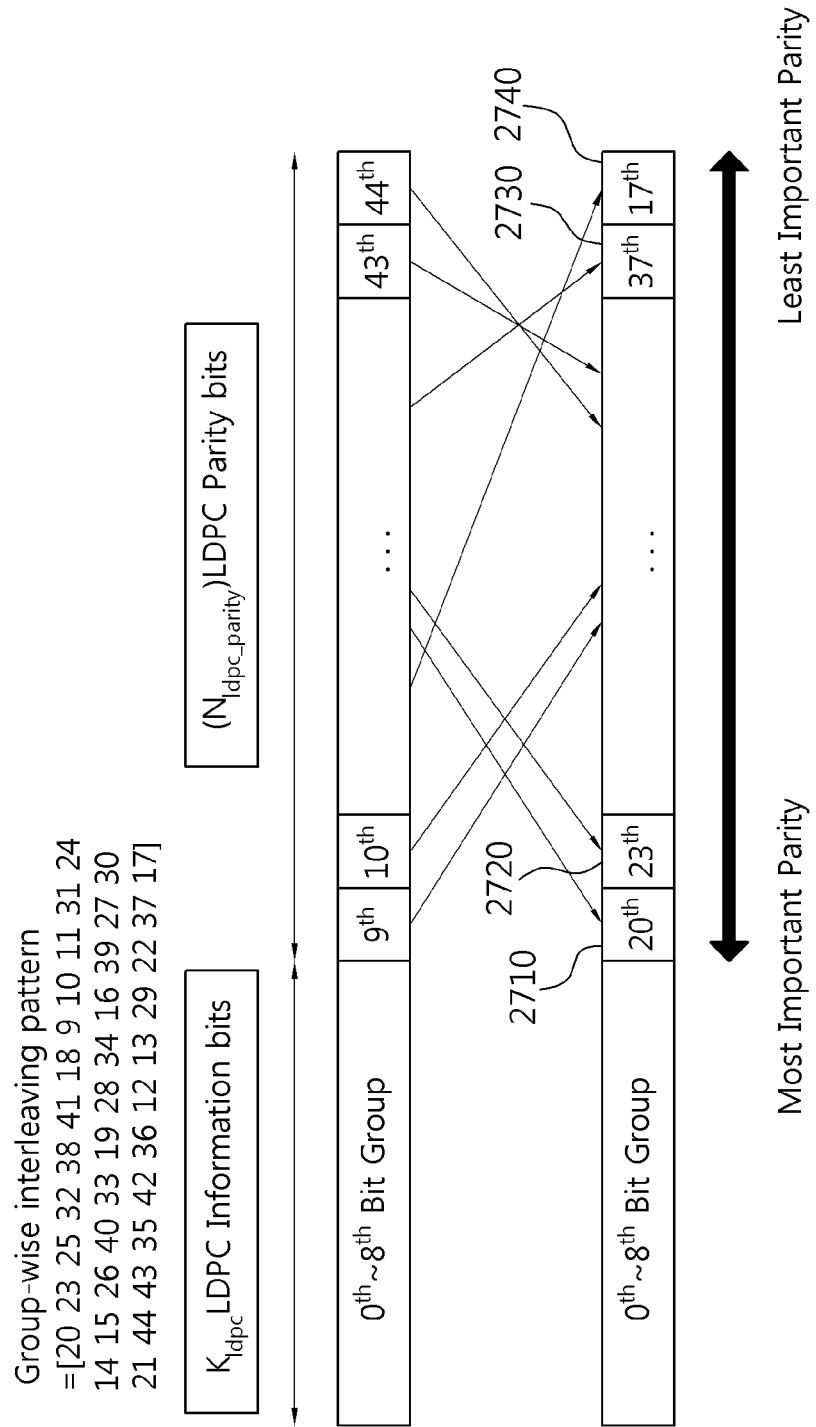
FIG. 16 is a diagram showing an example of the operation of the parity permutation unit shown in FIG. 13.

FIG. 16 is a diagram showing an example of the operation of the parity permutation unit shown in FIG. 13.

Referring to FIG. 16, a parity permutation operation in the case where the order of group-wise interleaving corresponding to the sequence [20 23 25 32 38 41 18 9 10 11 31 24 14 15 26 40 33 19 28 34 16 39 27 30 21 44 43 35 42 36 12 13 29 22 37 17] can be seen.

$K_{ldpc}$ (=3240) information bits are not interleaved, and 36 groups each composed of 360 bits (a total of 12960 bits) become an interleaving target.

Since the order of group-wise interleaving corresponds to the sequence [20 23 25 32 38 41 18 9 10 11 31 24 14 15 26 40 33 19 28 34 16 39 27 30 21 44 43 35 42 36 12 13 29 22 37 17], the parity permutation unit locates a 21st group indexed as 20 at a 10th group location 2710 indexed as 9, a 24th group indexed as 23 at a 11th group location 2720 indexed as 10, . . . , a 38th group indexed as 37 at a 44th group location 2730 indexed as 43, and a 18th bit group indexed as 17 at a 45th group location 2740 indexed as 44.

The parity puncturing may be performed from the rear side of the parity-interleaved parity bits (from the end of the 18th bit group indexed as 17).

Figure 17:
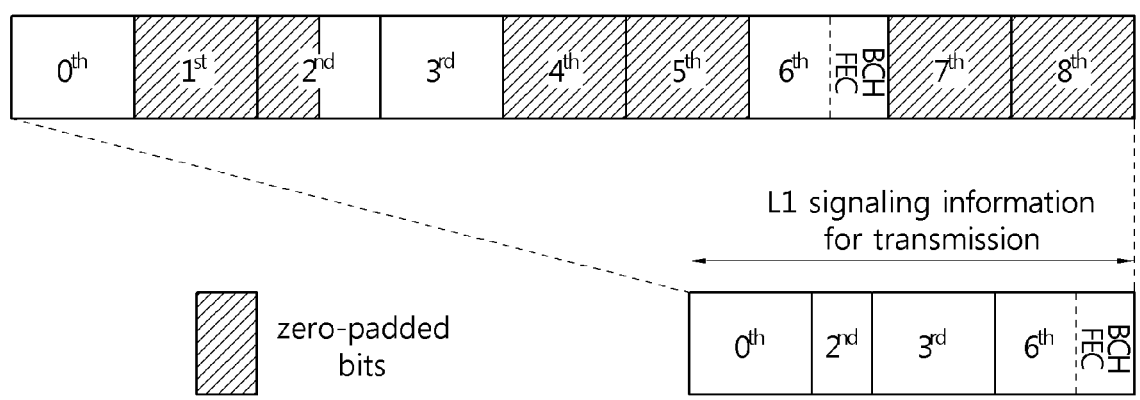
FIG. 17 is a diagram showing an example of the operation of the zero removing unit shown in FIG. 13.

FIG. 17 is a diagram showing an example of the operation of the zero removing unit shown in FIG. 13.

Referring to FIG. 17, it can be seen that the zero removing unit generates signaling information for transmission by removing zero-padded parts from the information part of an LDPC codeword.

As described above, the apparatus and method for generating broadcast signal frame according to the present invention are not limited to the configurations and methods of the aforementioned embodiments, but some or all of the embodiments may be selectively combined such that the embodiments are modified in various manners.

The invention claimed is:

1. A method of generating broad signal frame, comprising:
    generating a time-interleaved signal by performing interleaving on a BICM output signal; and
    generating a broadcast signal frame including a bootstrap and a preamble using the time-interleaved signal,
    wherein the bootstrap includes a symbol for signaling a signaling protection mode of L1-Basic of the preamble and OFDM parameters of L1-Basic, together.

2. The method of claim 1, wherein the symbol corresponds to a fixed-length bit string signaling the signaling protection mode along with the OFDM parameters.

3. The method of claim 2, wherein the fixed-length bit string is a bit string capable of identifying 256 combinations.

4. The method of claim 3, wherein the OFDM parameters correspond to a combination of a FFT size, a guard interval length and a pilot pattern.

5. The method of claim 4, wherein the signaling protection mode includes
    a first mode, a second mode and a third mode for identifying QPSK and a code rate of 3/15,
    a fourth mode for identifying 16-NUC (Non Uniform Constellation) and a code rate of 3/15, and
    a fifth mode for identifying 64-NUC (Non Uniform Constellation) and a code rate of 3/15.

6. The method of claim 5, wherein the OFDM parameters correspond to the combination among 32 combinations of FFT sizes, guard interval lengths, and pilot patterns.

7. The method of claim 6, wherein the first mode corresponds to a mode in which the parity repetition is performed, and the second and third modes correspond to a mode in which the parity repetition is not performed.

8. The method of claim 7, wherein the parity puncturing size of the second mode is larger than the parity puncturing size of the first mode and is smaller than the parity puncturing size of the third mode.

9. The method of claim 8, wherein the symbol corresponds to a lookup table in which
- a preamble structure corresponding to a second guard interval length is allocated prior to a preamble structure corresponding to a first guard interval length, the second guard interval length being shorter than the first guard interval length when the FFT sizes corresponding to the OFDM parameters are the same.

10. The method of claim 9, wherein the symbol corresponds to the lookup table in which
- the first mode, the second mode, the third mode, the fourth mode and the fifth mode are allocated in an order of robustness for the same combination of a FFT size, a guard interval length and a pilot pattern.

* * * * *